United States Patent
Hong et al.

(10) Patent No.: US 12,340,094 B2
(45) Date of Patent: Jun. 24, 2025

(54) STORAGE DEVICE AND OPERATING METHOD OF MEMORY CONTROLLER

(71) Applicant: SAMSUNG ELECTRONICS CO., LTD., Suwon-si (KR)

(72) Inventors: Jinwoo Hong, Suwon-si (KR); Kwangwoo Lee, Suwon-si (KR); Yunjung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/421,594

(22) Filed: Jan. 24, 2024

(65) Prior Publication Data
US 2024/0427498 A1    Dec. 26, 2024

(30) Foreign Application Priority Data

Jun. 20, 2023    (KR) .................. 10-2023-0078856

(51) Int. Cl.
*G06F 3/00* (2006.01)
*G06F 3/06* (2006.01)

(52) U.S. Cl.
CPC .......... *G06F 3/0619* (2013.01); *G06F 3/0659* (2013.01); *G06F 3/0679* (2013.01)

(58) Field of Classification Search
CPC ..... G06F 3/0619; G06F 3/0659; G06F 3/0679
See application file for complete search history.

(56) References Cited

U.S. PATENT DOCUMENTS

| | | |
|---|---|---|
| 7,257,025 B2 | 8/2007 | Maayan et al. |
| 7,876,621 B2 | 1/2011 | Sharon et al. |
| 7,889,563 B2 | 2/2011 | Cho et al. |
| 8,355,285 B2 | 1/2013 | Huang et al. |
| 8,631,288 B2 | 1/2014 | Helm et al. |
| 8,811,076 B2 | 8/2014 | Venkitachalam et al. |
| 9,478,300 B2 | 10/2016 | Kim et al. |
| 9,514,830 B2 | 12/2016 | Han et al. |
| 10,255,972 B1 | 4/2019 | Sato |
| 11,049,582 B1 | 6/2021 | Parthasarathy et al. |
| 11,163,483 B2 | 11/2021 | Kim et al. |
| 2013/0148436 A1 | 6/2013 | Kurosawa |
| 2014/0126285 A1 | 5/2014 | Kang |
| 2014/0129903 A1 | 5/2014 | Yoon et al. |
| 2014/0153330 A1 | 6/2014 | Yoon et al. |

(Continued)

FOREIGN PATENT DOCUMENTS

KR    10-2284658 B1    8/2021

*Primary Examiner* — Craig S Goldschmidt
(74) *Attorney, Agent, or Firm* — Sughrue Mion, PLLC

(57) ABSTRACT

Provided are a storage device and an operating method of a memory controller. The storage device includes a non-volatile memory that outputs data from selected memory cells based on read voltage information, the read voltage information including a start read voltage, an end read voltage, and a read command. Moreover, the storage device includes a memory controller that determines whether a search region defined by the start read voltage and the end read voltage is within a multi-peak region of a threshold voltage distribution corresponding to a first state of the selected memory cells, based on the search region being within the multi-peak region, change the search region, and based on the search region not being within to the multi-peak region, determine a new read voltage using the search region.

19 Claims, 26 Drawing Sheets

(56) References Cited

U.S. PATENT DOCUMENTS

| | | |
|---|---|---|
| 2014/0198569 A1 | 7/2014 | Kim et al. |
| 2016/0276040 A1* | 9/2016 | Han .................... G11C 13/004 |
| 2021/0098060 A1* | 4/2021 | Ni ......................... H10B 53/30 |
| 2022/0172785 A1 | 6/2022 | Yoo et al. |

\* cited by examiner

STORAGE DEVICE AND OPERATING METHOD OF MEMORY CONTROLLER

CROSS-REFERENCE TO RELATED APPLICATION

This application is based on and claims priority under 35 U.S.C. § 119 to Korean Patent Application No. 10-2023-0078856, filed on Jun. 20, 2023, in the Korean Intellectual Property Office, the disclosure of which is incorporated by reference herein in its entirety.

BACKGROUND

The disclosure relates to an electronic device, and more particularly, to a storage device capable of retrieving an optimal read voltage and an operating method of a memory controller.

Semiconductor memory devices may be classified into volatile memories, such as dynamic random access memory (DRAM) and static random access memory (SRAM), and non-volatile memories, such as electrically erasable programmable read-only memory (EEPROM), ferroelectric random access memory (FeRAM or FRAM), phase-change random access memory (PRAM), magnetoresistive random access memory (MRAM). A volatile memory device loses stored data when the power supply to the memory device is cut off, whereas a non-volatile memory device retains stored data even when the power supply to the memory device is cut off.

Devices using non-volatile memory include, for example, MP3 players, digital cameras, mobile phones, camcorders, flash cards, and solid state disks (SSDs). In line with the increase in the number of devices using non-volatile memory as storage devices, the capacity of non-volatile memories has also rapidly increased.

Also, as the process of manufacturing non-volatile memories (e.g., flash memory) has become more refined, it has been more difficult to read reliable data due to a change in a threshold voltage distribution over time. Accordingly, research has been conducted to increase data integrity.

SUMMARY

The disclosure provides a storage device with improved reliability of read data and an operating method of a memory controller.

According to an aspect of the disclosure, there is provided a storage device including: a non-volatile memory configured to output data from selected memory cells based on read voltage information, the read voltage information including a start read voltage, an end read voltage, and a read command; and a memory controller configured to: determine whether a search region defined by the start read voltage and the end read voltage is within a multi-peak region of a threshold voltage distribution corresponding to a first state of the selected memory cells, based on the search region being within the multi-peak region, change the search region, and based on the search region not being within to the multi-peak region, determine a new read voltage using the search region.

According to another aspect of the disclosure, there is provided an operating method of a memory controller, the operating method including: setting a search region defined by a start read voltage and an end read voltage; determining whether the search region is within a multi-peak region of a threshold voltage distribution corresponding to a first state of selected memory cells among a plurality of memory cells included in a non-volatile memory; based on the search region being within to the multi-peak region, changing the search region; and based on the search region not being within to the multi-peak region, determining a new read voltage using the search region.

According to another aspect of the disclosure, there is provided a storage device including: a non-volatile memory configured to output data from selected memory cells based on read voltage information including a start read voltage and an end read voltage and a read command; and a memory controller configured to provide the read voltage information and the read command to the non-volatile memory, the memory controller including: a first register configured to store reference region data representing a reference region; a search region determination circuit configured to: determine whether a search region defined by the start read voltage and the end read voltage is within the reference region, and output search region data representing the search region within the reference region; a second register configured to store validation reference number data representing a validation reference number; a search region validation circuit configured to: validate the search region of the search region data based on the search region data and the validation reference number data, and output validation result data corresponding to a validation result and validation data corresponding to a validated search region; and a read level determination circuit configured to determine a new read voltage using the validated search region of the validation data.

BRIEF DESCRIPTION OF THE DRAWINGS

Embodiments will be more clearly understood from the following detailed description taken in conjunction with the accompanying drawings in which.

DETAILED DESCRIPTION

Hereinafter, embodiments are described in detail with reference to the accompanying drawings.

Figure 1:
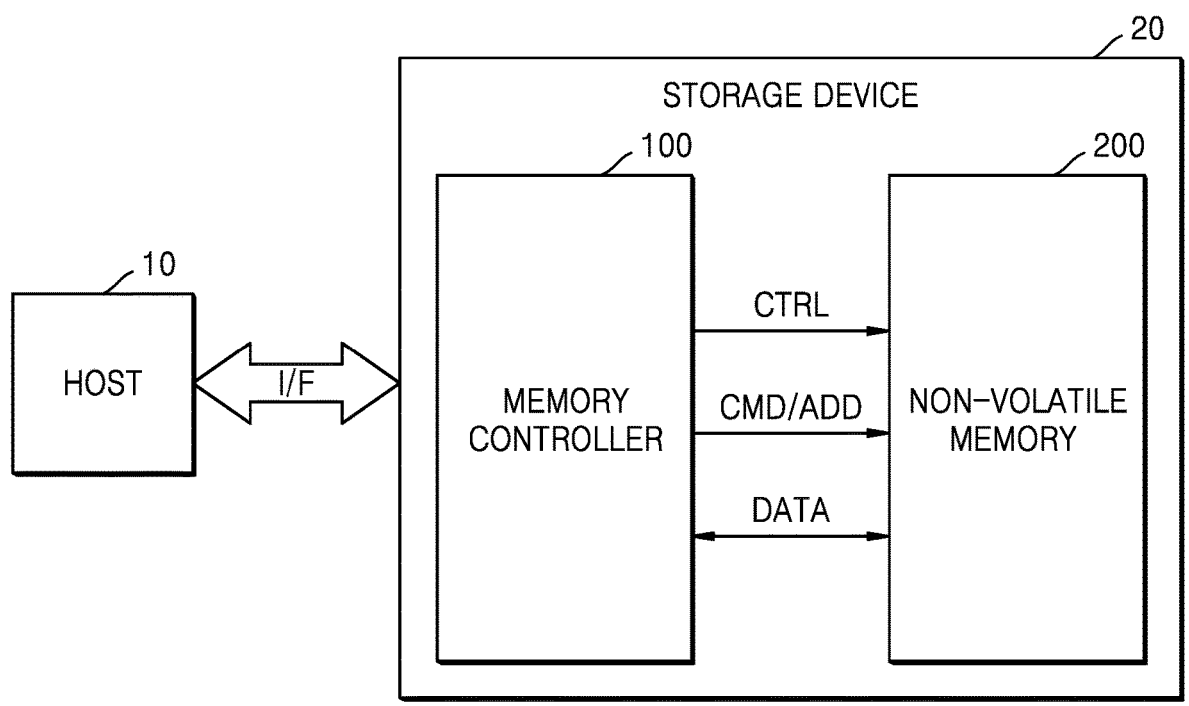
FIG. 1 is a block diagram illustrating a storage system according to an embodiment.

FIG. 1 is a block diagram illustrating a storage system 1 according to an embodiment.

Referring to FIG. 1, the storage system 1 may include a host 10 and a storage device 20.

The host 10 may communicate with the storage device 20 through an interface (I/F). The interface may be implemented as, for example, non-volatile memory express (NVMe), NVMe management interface (MI), or NVMe over fabric (NVMeof).

The host 10 may transmit to the storage device 20 a write request for storing data in the storage device 20. In addition, the host 10 may transmit to the storage device 20 a logical address and data for identifying data. According to an embodiment, the logical address may be included in the write request.

The host 10 may transmit to the storage device 20 a read request for reading data stored in the storage device 20. In addition, the host 10 may transmit to the storage device 20 a logical address for identifying data. According to an embodiment, the logical address may be included in the read request.

The storage device 20 may include a memory controller 100 and a non-volatile memory 200. The memory controller 100 and the non-volatile memory 200 may be integrated into a single semiconductor device. For example, the memory controller 100 and the non-volatile memory 200 may be integrated into a single semiconductor device to configure a memory card, a PC card, a compact flash card, a smart media card, a memory stick, a multimedia card, an SD card, a universal flash storage device, or solid state disk/drive (SSD). However, the disclosure is not limited thereto, and as such, according to another embodiment, the memory controller 100 and the non-volatile memory 200 may be integrated in another manner and/or into another type of electronic device.

The memory controller 100 may communicate with the host 10 through various standard interfaces. For example, the memory controller 100 may include an interface circuit, and the interface circuit may provide various standard interfaces between the host 10 and the memory controller 100. Standard interfaces may include, but is not limited to, advanced technology attachment (ATA), serial ATA (SATA), external SATA (e-SATA), small computer small interface (SCSI), serial attached SCSI (SAS), peripheral component interconnection (PCI), PCI express (PCI-E), IEEE 1394, a universal serial bus (USB), a secure digital (SD) card, multimedia card (MMC), embedded multimedia card (eMMC), universal flash storage (UFS), compact flash (CF) card interface, and the like.

The memory controller 100 may control the non-volatile memory 200 to read data stored in the non-volatile memory 200 or write data to the non-volatile memory 200 based on a request (e.g., a write request or a read request) received from the host 10. For example, the memory controller 100 may control the non-volatile memory 200 to read data stored in the non-volatile memory 200 or write data to the non-volatile memory 200 in response to a request (e.g., a write request or a read request) received from the host 10. According to an embodiment, the memory controller 100 may transmit a command/address CMD/ADD and/or a control signal CTRL to the non-volatile memory 200, thereby controlling a write operation (or a program operation), a read operation, and an erase operation on the non-volatile memory 200. Also, data DATA to be written and data DATA to be read may be transmitted and received between the memory controller 100 and the non-volatile memory 200.

According to an embodiment, the memory controller 100 may transmit a read command and address to the non-volatile memory 200. In this case, the read command may be a command instructing to read data stored in selected memory cells connected to a selected word line among a plurality of word lines. For example, the read command may be instruct or cause the memory to output data stored in selected memory cells connected to a selected word line among a plurality of word lines.

The memory controller 100 may control one or more operations of the non-volatile memory 200. For example, the memory controller 100 may control characteristics of the non-volatile memory 200 or a plurality of internal operations (e.g., performance adjustment, merge, wear leveling, etc.) required for efficient management of the non-volatile memory 200.

According to an embodiment, the memory controller 100 may set a search region in a read operation. The search region may be identified or defined by a start read voltage and an end read voltage. The memory controller 100 may determine whether the search region belongs to a reference region.

According to an embodiment, the memory controller 100 may determine whether the search region belongs to a multi-peak region of a single threshold voltage distribution. The multi-peak region of the single threshold voltage distribution is described below with reference to FIG. 13.

The non-volatile memory 200 may include a plurality of memory blocks. Each of the plurality of memory blocks may include a plurality of memory cells. The memory cells may have various threshold voltage distributions according to programmed data. For example, when the memory cell is a single-level cell (SLC) that stores one bit per memory cell, the SLC may have two threshold voltage distributions according to a program state. That is, the single-level cell may have a threshold voltage distribution corresponding to an erase state or a threshold voltage distribution corresponding to a program state. For another example, when the memory cell is a multi-level cell (MLC) storing two bits per memory cell, the MLC may have four threshold voltage distributions according to a program state. That is, the MLC may have a threshold voltage distribution corresponding to an erase state, a threshold voltage distribution corresponding to a first program state, a threshold voltage distribution corresponding to a second program state, or a threshold voltage distribution corresponding to a third program state. As another example, if the memory cell is a triple-level cell (TLC) storing three bits per memory cell, the TLC may have eight threshold voltage distributions according to a program state. When the memory cell store four or more bits per one memory cell, the memory cell may have 16 or more threshold voltage distributions according to a program state. One threshold voltage distribution (or single threshold voltage distribution) may correspond to a certain state of the memory cell.

According to the embodiment described above, an effect of reducing data errors due to an erroneous read voltage, an effect of improving performance of a read operation, an effect of improving reliability of read data, and an effect of increasing the lifespan of a storage device may be obtained.

Figure 2:
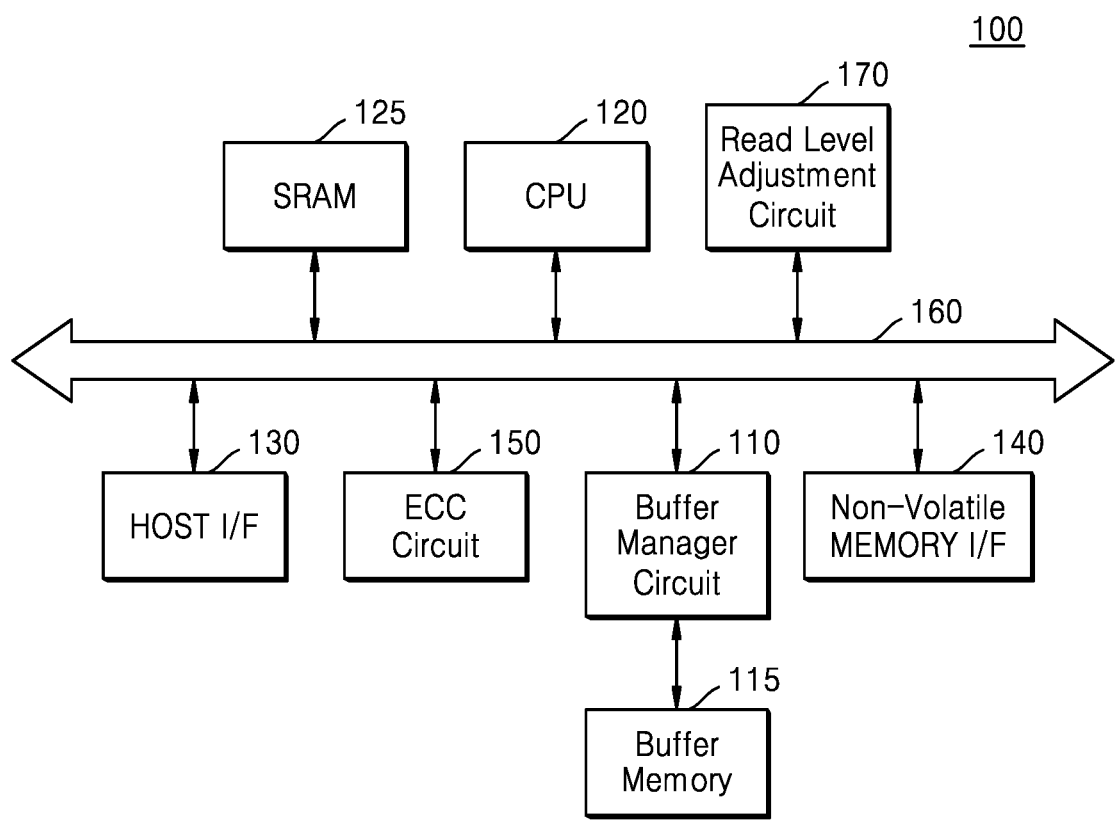
FIG. 2 is a block diagram illustrating a memory controller according to an embodiment.

FIG. 2 is a block diagram illustrating the memory controller 100 according to an embodiment.

Referring to FIG. 2, the memory controller 100 may include a buffer manager circuit 110, a buffer memory 115, a CPU 120, an SRAM 125, a host interface (I/F) 130, a non-volatile memory I/F 140, an error correction code (ECC) circuit 150, a bus 160, and a read level adjustment circuit 170.

The buffer manager circuit 110 may manage the buffer memory 115. The buffer memory 115 may include volatile memory, such as static random access memory (SRAM) and dynamic random access memory (DRAM). The buffer memory 115 may temporarily store data to be stored in the non-volatile memory 200 and data read from the non-volatile memory 200. In FIG. 2, the buffer memory 115 is implemented inside the memory controller 100, but is not limited thereto. In other embodiments, buffer memory 115 may be implemented outside memory controller 100.

The host I/F 130 may communicate with the host. The host I/F 130 may have an I/F protocol to communicate with the host. The I/F protocol with the host may be a ultra-high speed (UHS) (UHS-I or UHS-II), PCI-E, ATA, SATA, parallel ATA (PATA), or SAS. However, the disclosure is not limited thereto.

The non-volatile memory I/F 140 may exchange data between the non-volatile memory 200 and the memory controller 100.

Commands (or command sets) and addresses may be transferred to the non-volatile memory 200 so that the non-volatile memory I/F 140 and the non-volatile memory 200 may perform a write operation (or a program operation), a read operation, or an erase operation. For example, the non-volatile memory I/F 140 may transmit a read command to the non-volatile memory 200 and receive data read from the non-volatile memory 200.

The CPU 120 may perform a control operation for writing data into the non-volatile memory 200. The CPU 120 may perform a control operation for reading data from the non-volatile memory 200. The CPU 120 may control data exchange between the buffer memory 115, the host I/F 130, the ECC circuit 150, and the non-volatile memory I/F 140 through the bus 160. The CPU 120 may execute a flash translation layer (FTL).

The SRAM 125 may store programs or codes executed by the CPU 120. The FTL executed by the CPU 120 may also be stored in the SRAM 125. According to an embodiment, the program executed by the FTL or CPU 120 may be stored in a certain region of the non-volatile memory 200 and then loaded into the SRAM 125 when the storage device 20 is initially driven.

The ECC circuit 150 may encode data to be stored in the non-volatile memory 200. The ECC circuit 150 may decode the data read from the non-volatile memory 200 to detect an error included in the read data and correct the error.

The ECC circuit 150 may perform hard decision decoding using hard decision data read from the non-volatile memory 200. The ECC decoder 152 may also perform soft decision decoding using soft decision data read from the non-volatile memory 200.

The read level adjustment circuit 170 may set a search region for searching for an optimal read voltage and reset the search region by determining whether the search region belongs to a reference region. The read level adjustment circuit 170 may search for an optimal read voltage based on the set search region.

The memory controller 100 may further include components, such as a read-only memory (ROM) that stores code data executed when the storage device 20 is powered on, a clock module that generates a clock signal, and a timer.

Figure 3:
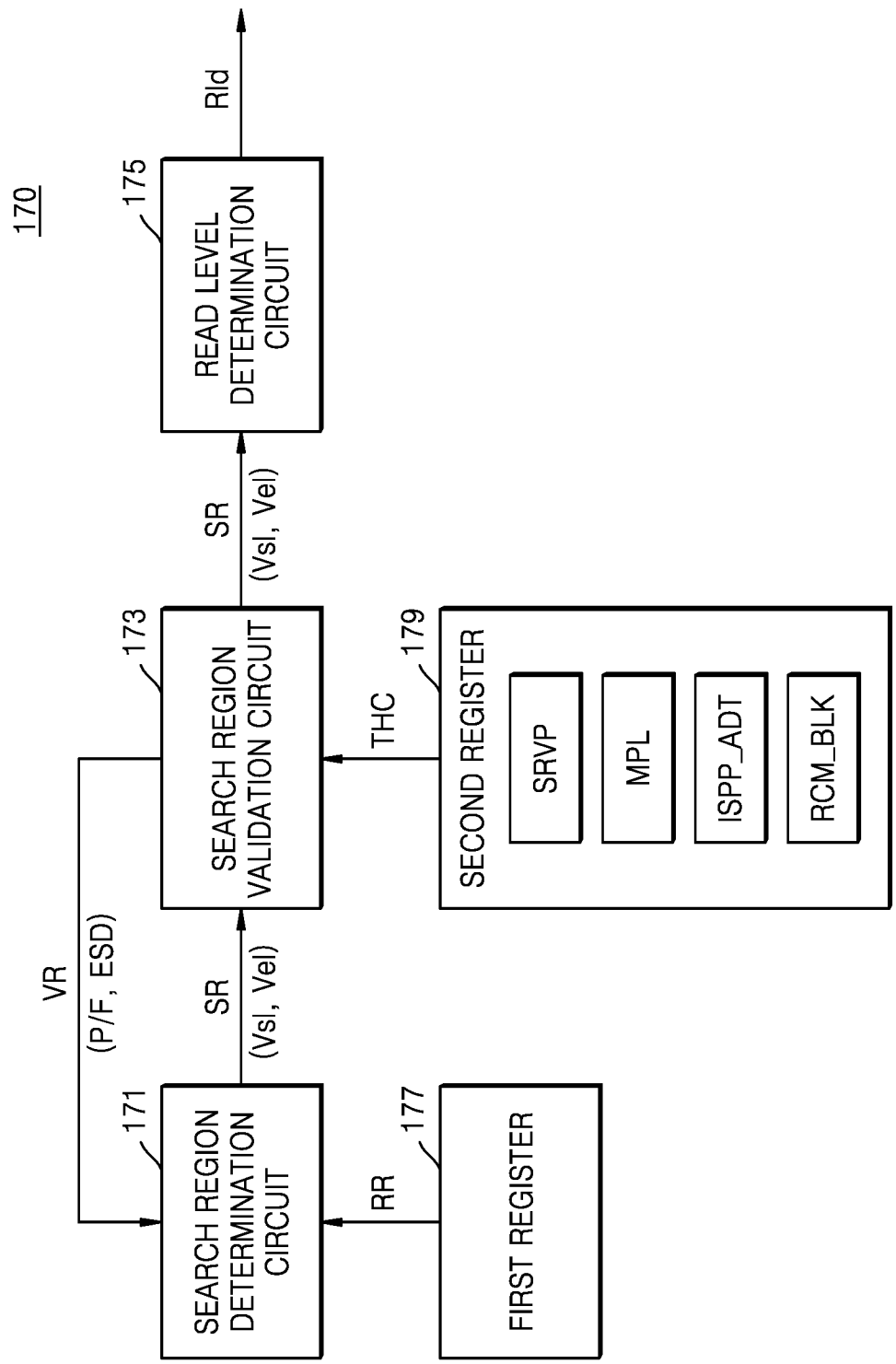
FIG. 3 is a block diagram illustrating a read level adjustment circuit according to an embodiment.

FIG. 3 is a block diagram illustrating a read level adjustment circuit according to an embodiment.

Referring to FIG. 3, the read level adjustment circuit 170 may include a search region determination circuit 171, a search region validation circuit 173, a read level determination circuit 175, a first register 177, and a second register 179.

The search region determination circuit 171 may set a search region SR. For example, the search region may be defined by a start read voltage Vsl and an end read voltage Vel. The search region determination circuit 171 may determine whether the search region SR belongs to the reference region RR. In an example case in which the search region SR does not belong to the reference region RR, the search region determination circuit 171 may change the search region SR. In an example case in which the search region SR belongs to the reference region RR, the search region determination circuit 171 may provide information on the search region SR to the search region validation circuit 173. The information on the search region SR may be referred to as search region data representing the search region SR belonging to the reference region RR. The search region SR and the reference region RR are described below with reference to FIGS. 8 and 9.

The search region validation circuit 173 may validate the search region SR of the search region data based on the search region data and a number of validation references. The number of validation references may be referred to as validation reference a validation reference number THC or a validation reference count. Validating the search region SR may include determining whether the search region SR belonging to the reference region RR does not belong to a multi-peak region of a single threshold voltage distribution. In an example case in which the search region SR passes validation, the search region validation circuit 173 may provide information on the validated search region SR to the read level determination circuit 175, and provide information indicating validation pass to the search region determination circuit 171. The search region SR passes validation may mean that the search region SR is outside the multi-peak region of the single threshold voltage distribution. When the search region SR fails validation, the search region validation circuit 173 may provide the search region determination circuit 171 with information indicating validation fail and information indicating a change direction ESD. The search region SR fails validation may mean that the search region SR belongs to the multi-peak region of the single threshold voltage distribution. A validation result P/F may refer to validation pass or validation fail. Information indicating the validation result P/F may be referred to as validation result data indicating the validation result P/F. Information indicating the change direction ESD may be referred to as direction data indicating the change direction ESD. According to an embodiment, the validation result P/F and the change direction ESD may be included in validation information VR. Validation information VR according to an embodiment may be data including 2 bits, any one bit of the 2 bits may represent the validation result P/F and the other bit of the 2 bits may represent the change direction. ESD. However, the disclosure is not limited thereto. Information on the validated search region SR may be referred to as validation data indicating the validated search region SR.

According to an embodiment, when the search region SR fails validation, the search region validation circuit 173 may store information on word lines connected to corresponding memory cells in the second register 179. The information on the word line may be stored in a multi-peak list MPL of the second register 179. According to an embodiment, the search region validation circuit 173 may additionally store information on a memory block including the word lines connected to the corresponding memory cells in the multi-peak list MPL of the second register 179. The multi-peak list MPL may be a list for managing word lines and/or memory blocks corresponding to the search region SR that has failed the validation. When a program operation or an erase operation is later performed on a word line and/or a memory block listed up in the multi-peak list MPL, a program voltage or erase voltage may be tuned.

According to an embodiment, when the search region SR fails validation, the search region validation circuit 173 may store information on a step voltage difference of an increment step pulse program (ISPP) to be applied to word lines connected to corresponding memory cells in the second register 179. The step voltage difference in the ISPP may refer to a difference in program voltage between steps in the ISPP. Information on the step voltage difference of the ISPP may be stored in an ISPP adjustment list ISPP_ADT of the second register 179. When a program operation is subsequently performed on the word lines and/or the memory block listed up in the multi-peak list MPL and the ISPP adjustment list ISPP_ADT, a program voltage may be adjusted.

According to an embodiment, when the search region SR that has failed the validation does not belong to the reference region RR, the search region determination circuit 171 and/or the search region validation circuit 173 may store the memory block including the word lines connected to corresponding memory cells in the second register 179, as a target of reclaim. During reclaim, all data stored in a memory block selected as the reclaim target may be stored in a free memory block, and the memory block selected as the reclaim target may be erased. Information on the memory block selected as the target of reclaim may be stored in a reclaim block list RCM_BLK of the second register 179.

According to an embodiment, the search region determination circuit 171 may change the search region SR based on the validation information VR and may provide the changed search region SR to the search region validation circuit 173.

The read level determination circuit 175 may search for a new read voltage RLd by using the search region SR validated by the search region validation circuit 173. According to an embodiment, the read level determination circuit 175 may search for the new read voltage RLd by performing a valley search operation in the search region SR. The valley search operation may be an operation of searching for a valley between threshold voltage distributions of memory cells connected to a selected word line among a plurality of word lines. Here, the valley may be formed at a point at which a threshold voltage distribution corresponding to one state and a threshold voltage distribution corresponding to another state cross each other.

The first register 177 may store reference region data representing the reference region RR. The first register 177 may provide reference region data to the search region determination circuit 171.

The second register 179 may store a parameter list SRVP. The parameter list SRVP may include information on the validation reference number. The information on the validation reference number THC may be referred to as validation reference number data representing the validation reference number THC. According to an embodiment, there may be one or more types of validation reference number THC. For example, the validation reference number THC may include first validation reference number and second validation reference number.

According to an embodiment, the second register 179 may further store the multi-peak list MPL, the ISPP adjustment list ISPP_ADT, and a reclaim block list (RCM_BLK).

Although FIGS. 2 and 3 illustrates a read level adjustment circuit 170 including a determination circuit 171, a search region validation circuit 173, a read level determination circuit 175, the disclosure is not limited thereto. As such, according to another embodiment, the operations and functions of the read level adjuster 170, the determination circuit 171, the search region validation circuit 173 and/or the read level determination circuit 175 may be implemented in software, hardware, or a combination of software and hardware. For example, a read level adjuster or a read level adjustment module may perform the operations and functions of the read level adjuster 170. According to an embodiment, when the read level adjuster is implemented as software, the read level adjuster may be implemented as part of a function of the FTL and may be executed by the CPU 120.

Figure 4:
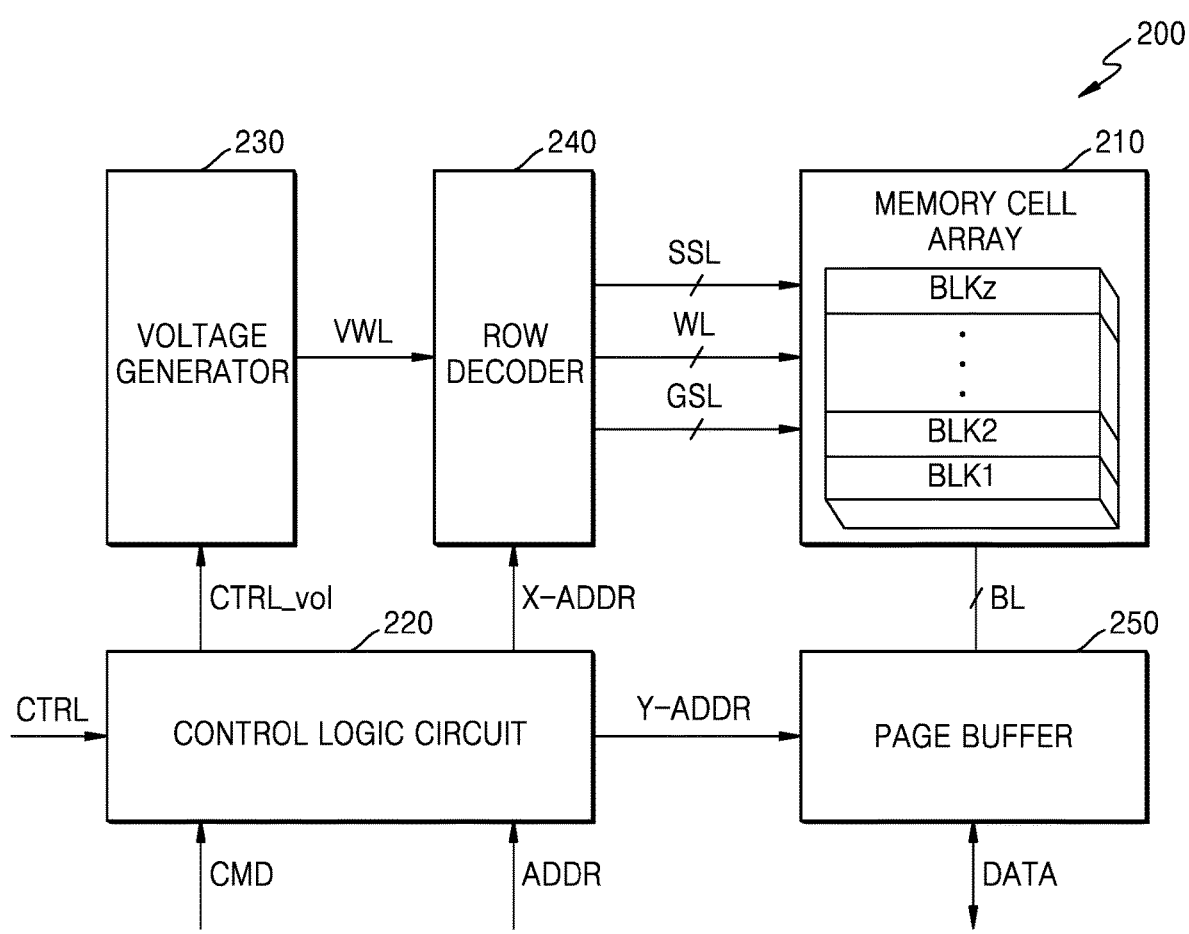
FIG. 4 is a block diagram illustrating a non-volatile memory according to an embodiment.

FIG. 4 is a block diagram illustrating a non-volatile memory 200 according to an embodiment.

Referring to FIG. 4, the non-volatile memory 200 may include a memory cell array 210, a control logic circuit 220, a voltage generator 230, a row decoder 240, and a page buffer circuit 250. In another embodiment, the non-volatile memory 200 may further include a data input/output (I/O) circuit or an I/O interface.

The memory cell array 210 may include a plurality of memory cells and may be connected to word lines WL, string select lines SSL, ground select lines GSL, and a plurality of bit lines BL. According to an embodiment, the memory cell array 210 is connected to the row decoder 240 through word lines WL, string select lines SSL, and ground select lines GSL. Also, the memory cell array 210 is connected to the page buffer circuit 250 through a plurality of bit lines BL.

Figure 5A:
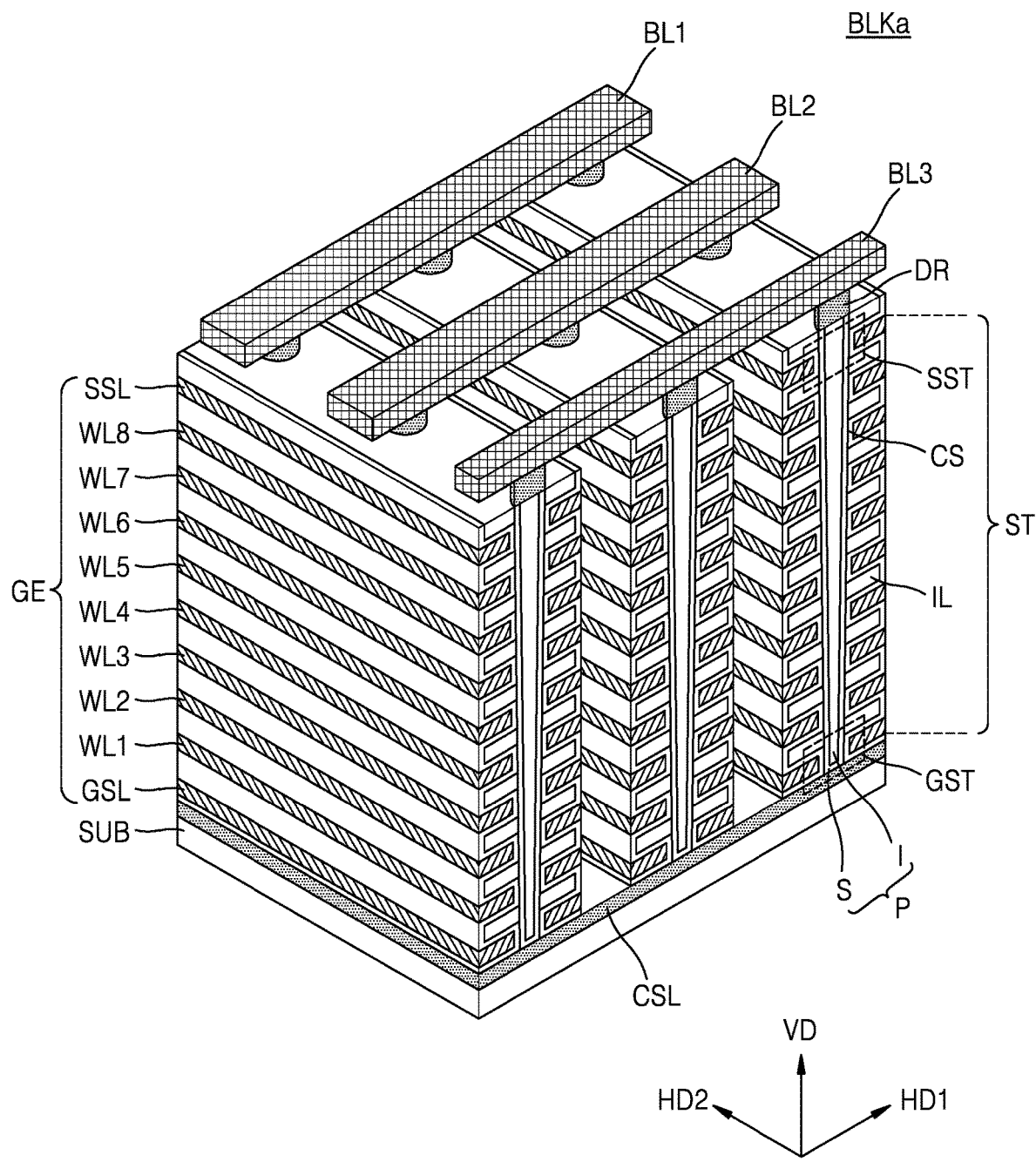
FIGS. 5A and 5B are perspective views illustrating memory blocks according to an embodiment.
Figure 5B:
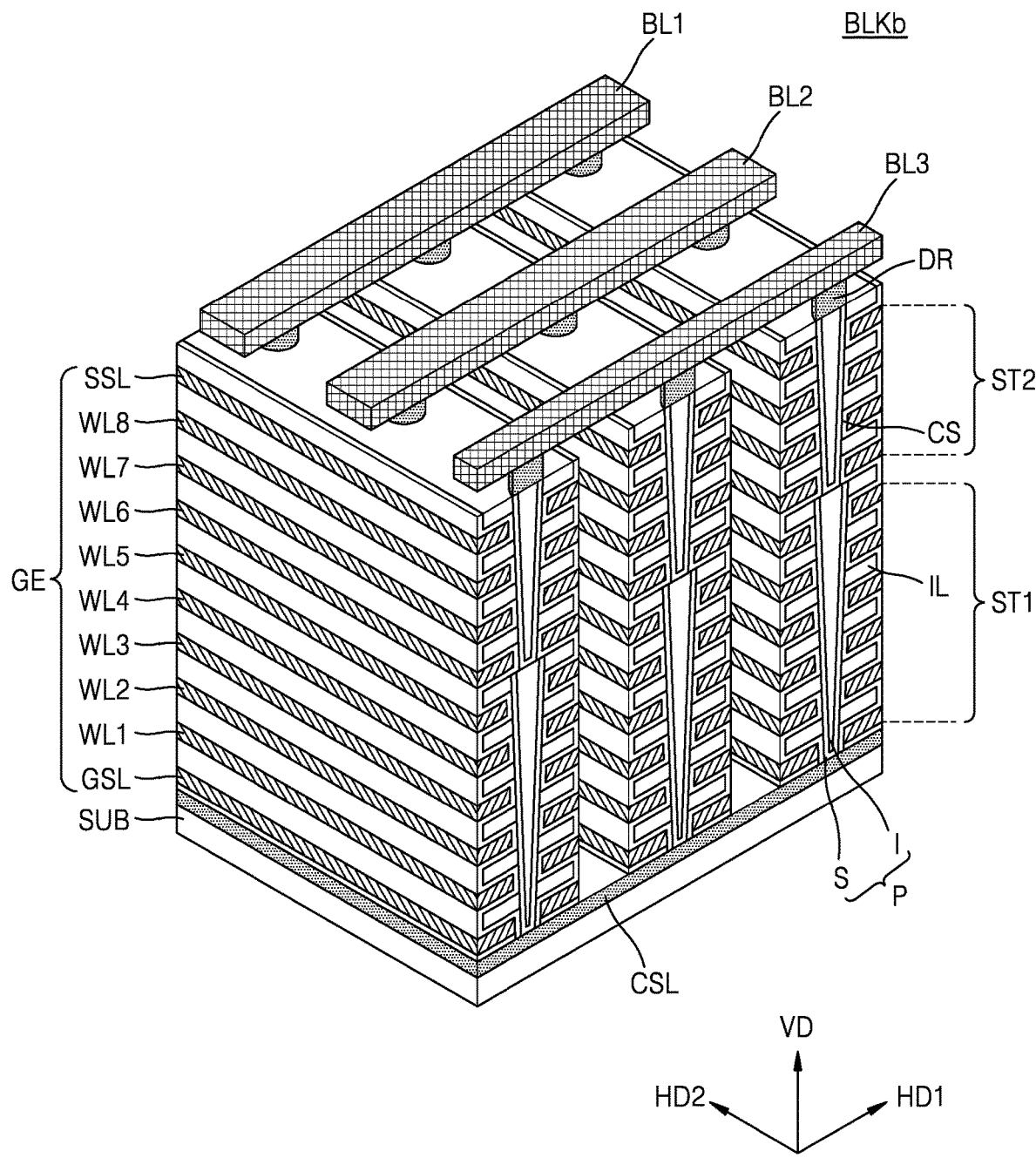

The memory cell array 210 may include a plurality of memory blocks BLK1 to BLKz. For example, each of the memory blocks BLK1 to BLKz may have a 3D structure (or vertical structure). According to an embodiment, each memory block includes structures extending in first, second and third directions as illustrated in FIGS. 5A and 5B. For example, each memory block includes a plurality of NAND strings extending in a third direction. In this case, the NAND strings may be apart from each other by a certain distance in the first and second directions. The memory blocks BLK1 to BLKz may be selected by the row decoder 240. For example, the row decoder 240 may select a memory block corresponding to a block address from the memory blocks BLK1 to BLKz.

Each of the memory cells included in the memory cell array 210 may store at least one bit. For example, a memory cell may be an SLC that stores 1 bit of data. In another example, the memory cell may be an MLC that stores 2-bit data. In another example, the memory cell may be a TLC that stores 3 bits of data. In another example, the memory cell may be a quad-level cell (or quadruple-level cell QLC that stores 4-bit data. However, the disclosure is not limited thereto.

The memory blocks BLK1 to BLKz may include at least one of a SLC block including SLCs, a MLC block including MLCs, a TLC block including TLCs, and a QLC block including QLCs. Some of the memory blocks BLK1 to BLKz included in the memory cell array 210 may be SLC blocks, and the other memory blocks may be MLC blocks or TLC blocks.

When an erase voltage is applied to the memory cell array 210, a plurality of memory cells may be in an erase state, and when a program voltage is applied to the memory cell array 210, a plurality of memory cells may be in a program state. In this case, each memory cell may have an erase state or at least one program state classified according to a threshold voltage. That is, the states of memory cells may include an erase state and at least one program state, and a certain state of each memory cell may be an erase state or a certain program state.

The control logic circuit 220 may control one or more operations within the non-volatile memory 200. For example, the control logic circuit 220 may output various control signals for writing data to the memory cell array 210 or reading data from the memory cell array 210 based on the command CMD, the address ADDR, and the control signal CTRL.

Various control signals output from the control logic circuit 220 may be provided to the voltage generator 230, the row decoder 240, and the page buffer circuit 250. The control logic circuit 220 may provide the voltage control signal CTRL_vol to the voltage generator 230.

The voltage generator 230 may be connected to the memory cell array 210 through the word lines WL. The voltage generator 230 may generate various types of voltages for performing a program operation, a read operation, and an erase operation on the memory cell array 210 based on the voltage control signal CTRL_vol. The voltage generator 230 may generate word line voltages VWL. For example, the word line voltages VWL may include, but is not limited to, a program voltage, a validate voltage, a read voltage, an erase voltage, and the like.

The program voltage, validate voltage, read voltage, erase voltage, etc. generated by the voltage generator 230 may be provided to a selected word line among the word lines WL. The selected word line may be at least one word line selected by a row address X-ADDR. The selected word line may be referred to as a select word line.

During an erase operation, the voltage generator 230 may apply an erase voltage to a well and/or a common source line of a memory block. Also, the voltage generator 230 may apply an erase allow voltage (e.g., a ground voltage) to all word lines WL of the memory block or to word lines corresponding to some sub-blocks based on an erase address. During an erase validation operation, the voltage generator 230 may apply the erase validate voltage to all word lines WL of one memory block or may apply the erase validate voltage in units of word lines.

During a program operation, the voltage generator 230 may apply a program voltage to a selected word line among the word lines WL and apply a program pass voltage to unselected word lines among the word lines WL. Also, during the program validation operation, the voltage generator 230 may apply a program validate voltage to the selected word line and apply a validate pass voltage to unselected word lines.

During a read operation, the voltage generator 230 may apply a read voltage to selected word lines and apply a read pass voltage to unselected word lines.

The row decoder 240 may select a certain word line among the word lines WL based on the row address X-ADDR received from the control logic circuit 220. For example, the row decoder 240 may select a certain word line among the word lines WL in response to the row address X-ADDR received from the control logic circuit 220. According to an embodiment during a program operation, the row decoder 240 may provide a program voltage to a selected word line. In addition, in response to the row address X-ARRD received from the control logic circuit 220, the row decoder 240 may select some of the string select lines SSL or some of the ground select lines GSL.

The page buffer circuit 250 may be connected to the memory cell array 210 through the bit lines BL. The page buffer circuit 250 may select some of the bit lines BL based on a column address Y-ADDR received from the control logic circuit 220. For example, in response to a column address Y-ADDR received from the control logic circuit 220, the page buffer circuit 250 may select some of the bit lines BL. During a validation operation (e.g., an erase validation operation or a program validation operation) or a read operation, the page buffer circuit 250 may operate as a sense amplifier to sense data stored in a selected memory cell through a selected bit line. Meanwhile, during a program operation, the page buffer circuit 250 may operate as a write driver to input data to be stored in the memory cell array 210.

The page buffer circuit 250 may store data read from the memory cell array 210 or data to be stored in the memory cell array 210.

The page buffer circuit 250 may include a plurality of page buffers respectively connected to the bit lines BL. The page buffers may be arranged to respectively correspond to the bit lines, and each page buffer may include a plurality of latches. Hereinafter, the page buffer circuit 250 is defined as including the page buffers respectively coupled to the bit lines. However, in the embodiments, the term may be defined to be different, and as an example, one page buffer is provided to correspond to the bit lines and a unit of configuration provided to correspond to each bit line may be defined as a page buffer unit.

The control logic circuit 220, the voltage generator 230, the row decoder 240, and the page buffer circuit 250 may be included in peripheral circuits.

FIGS. 5A and 5B are perspective views illustrating memory blocks BLKa and BLKb according to an embodiment.

Referring to FIG. 5A, the memory block BLKa may include a stack ST extending in a vertical direction VD on top of a substrate SUB. For example, the memory block BLKa may include the single stack ST between the substrate SUB and the bit lines BL1, BL and BL3. A common source line CSL may be provided on the substrate SUB, and insulating films IL extending in a second horizontal direction HD2 are sequentially provided in the vertical direction VD on a region of the substrate SUB between two adjacent common source lines CSL, and the insulating films IL are apart from each other by a certain distance in the vertical direction VD. Pillars P penetrating the insulating films IL in the vertical direction VD are provided on a region of the substrate SUB between two adjacent common source lines CSL. The pillar may be referred to as a channel hole. The pillars P may be formed in a cup shape (or a cylinder shape with a closed bottom) extending in the vertical direction VD. A surface layer S of each of the pillars P may include a first type silicon material and may function as a channel region. Meanwhile, an inner layer I of each of the pillars P may include an insulating material, such as silicon oxide or an air gap.

In a region between two adjacent common source lines CSL, a charge storage layer CS is provided along the insulating films IL, the pillars P, and an exposed surface of the substrate SUB. The charge storage layer CS may include a gate insulating layer, a charge trap layer, and a blocking insulating layer. For example, the charge storage layer CS may have an oxide-nitride-oxide (ONO) structure. In addition, gate electrodes GE, such as select lines GSL and SSL and word lines WL1 to WL8 are provided on an exposed surface of the charge storage layer CS in a region between two adjacent common source lines CSL. Drains DR are respectively provided on the pillars P. Bit lines BL1, BL and BL3 extending in a first horizontal direction HD1 and apart from each other by a certain distance in a second horizontal direction HD2 are provided on the drains DR.

Referring to FIG. 5B, the memory block BLKb corresponds to a modified example of the memory block BLKa shown in FIG. 5A, and the above description given with reference to FIG. 5A may also be applied to the present embodiment shown in FIG. 5B. The memory block BLKb may include a first stack ST1 and a second stack ST2 stacked on the substrate SUB in the vertical direction VD. For example, the memory block BLKb may include two stacks ST1 and ST2 between the substrate SUB and the bit lines BL1, BL and BL3. Accordingly, the memory block BLKb may have a multi-stack structure, for example, a two-stack structure. However, the disclosure is not limited thereto, and according to an embodiment, the memory block BLKb may include three or more stacks between the substrate SUB and the bit lines BL1, BL and BL3.

For reasons of a manufacturing process, the size of the pillars P (or the size of the channel hole or the channel length) may vary depending on the position of the word line. According to an embodiment, for example, as the position of the word line is closer to the lower end, the size of each of the pillars P corresponding to the corresponding word line may decrease. As the size of each of the pillars P decreases, the degradation in the corresponding word line may increase. Therefore, the degradation of the lower word line may be greater than the degradation of the upper word line.

Figure 6:
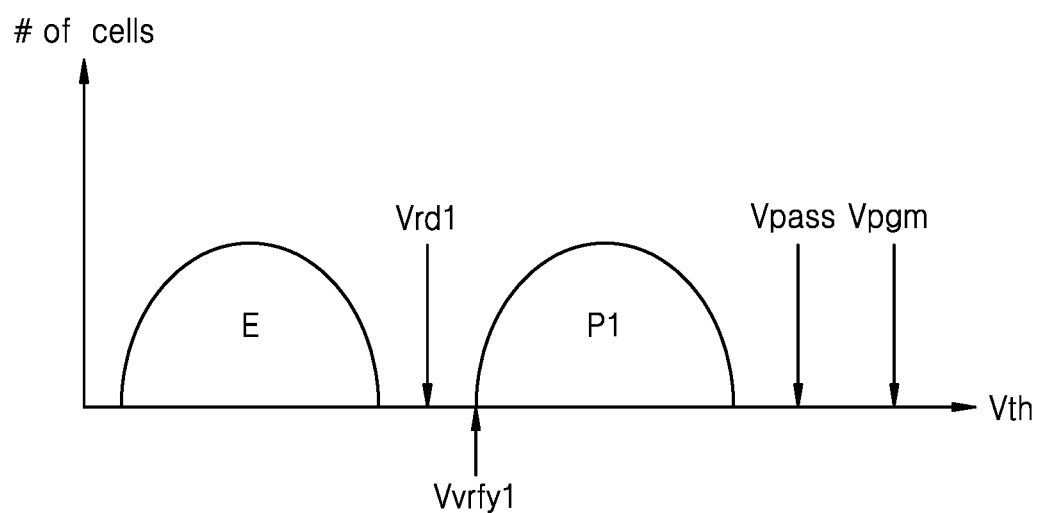
FIG. 6 is a diagram illustrating states of a plurality of memory cells according to an embodiment.

FIG. 6 is a diagram illustrating states of a plurality of memory cells according to an embodiment.

Referring to FIG. 6, states E and P1 of the SLC are shown in FIG. 6. In FIG. 6, the horizontal axis represents a threshold voltage Vth of a memory cell, and the vertical axis represents the number of memory cells (# of cells) corresponding to the threshold voltage Vth. The SLC may have one of two states (E and P1). For example, the SLC may have an erase state E or a program state P1.

Due to minute differences in electrical characteristics between a plurality of memory cells included in the non-volatile memory 200, memory cells programmed with the same data may not have the same threshold voltage. Each of the threshold voltages of the memory cells may form a threshold voltage distribution within a certain range.

During the program operation, after a pass voltage Vpass is applied to all word lines WL, the program voltage Vpgm may be applied to a selected word line. A program execution result (or validation) of the states E and P1 of the SLC may be determined by applying a first program validate voltage Vvrfy1 to the selected word line. The pass voltage Vpass may be a voltage sufficient to turn on the memory cell and may be a program pass voltage. According to an embodiment, the SLC may be programmed such that areas of threshold voltage distributions respectively corresponding to the states E and P1 of the SLC are equal to each other. In another embodiment, the SLC may be programmed such that the area of the threshold voltage distribution corresponding to any one state of the SLC is different from the area of the threshold voltage distribution corresponding to the other state of the SLC.

During a read operation, the states E and P1 of the SLC may be determined by applying a first read voltage Vrd1 to the selected word line and applying a pass voltage Vpass to the unselected word line. In this case, the pass voltage Vpass may be, for example, a read pass voltage. The first read voltage Vrd1 may have a voltage level between an erase state E and a first program state P1. When the first read voltage Vrd1 is applied to the selected word line, the memory cell having the erase state E becomes an on cell, and the memory cell having the first program state P1 may become an off-cell.

Although the embodiment shown in FIG. 6 is based on the SLC, the embodiments are not limited thereto and may also be applied to a MLC that may have four states (e.g., E, P1 to P3), a TLC that may have eight states (e.g., E, P1 to P7), and a QLC that may have 16 states (e.g., E and P1 to P15).

Figure 7:
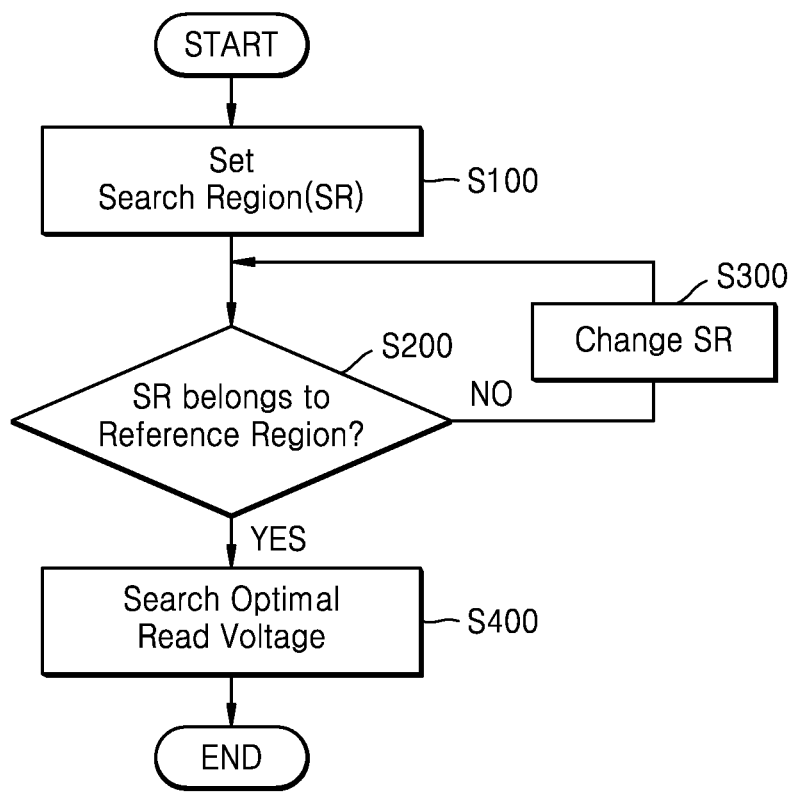
FIG. 7 is a flowchart illustrating an operating method of a memory controller according to an embodiment.

FIG. 7 is a flowchart illustrating an operating method of a memory controller according to an embodiment.

Referring to FIG. 7, the operating method of FIG. 7 may be performed by the memory controller 100 of FIGS. 1 and 2.

According to an embodiment, in operation S100, the method may include setting a search region SR. For example, before searching for an optimal read voltage, the memory controller 100 may set a search region SR in which an optimal read voltage exists. According to an embodiment, the search region SR may be set to be different for each word line.

In operation S200, the method may include determining whether the search region SR belongs to the reference region RR. For example, the memory controller 100 may determine whether the search region SR belongs to the reference region RR. For example, the memory controller 100 may determine whether the search region SR fully overlaps the reference region RR. In this case, the entire search region SR is within the reference region RR. However, the disclosure is not limited to these example cases.

In operation S300, the method may include changing the search region SR based on the search region SR not belonging to the reference region RR (S200, NO). For instance, in an example case in which the search region SR does not belong to the reference region RR (S200, NO), the memory controller 100 changes the search region SR (S300). In this case, in which, the changed search region SR does not belong to the reference region RR (S200, NO), operations S300 and S200 may be repeated.

In operation S400, the method may include searching for an optimal read voltage based on the search region SR. For example, based on the search region SR belonging to the reference region RR (S200, YES), the memory controller 100 may search for an optimal read voltage based on the search region SR. A method of searching for an optimal read voltage may be different for each word line.

Figure 8:
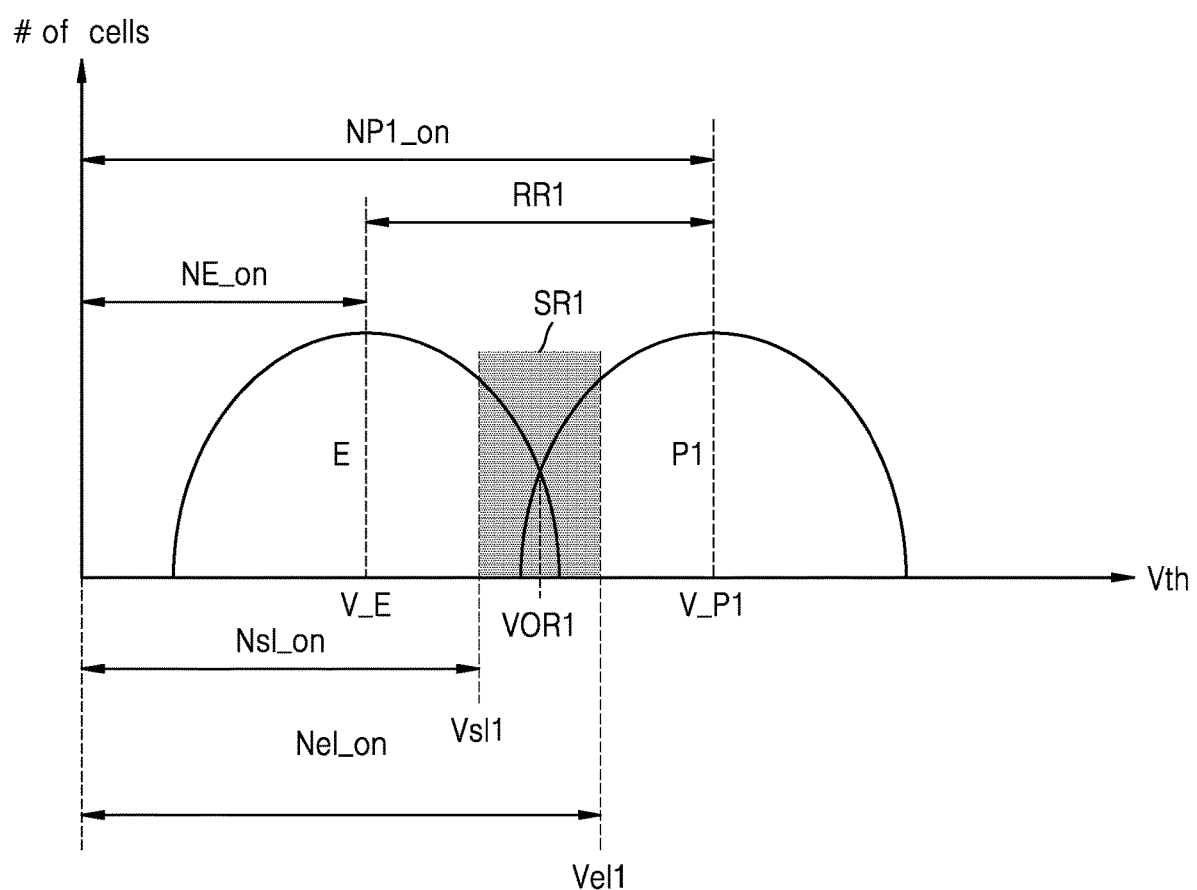
FIG. 8 is a diagram illustrating a search region and a reference region according to an embodiment.

FIG. 8 is a diagram illustrating a search region and a reference region according to an embodiment.

Referring to FIG. 8, when a program operation and an erase operation are repeated for memory cells, a threshold voltage distribution may be modified. For example, the threshold voltage distribution may be shifted (e.g., shifted to the left or right), and the shifted threshold voltage distribution may overlap at least a portion of a neighboring threshold voltage distribution. For example, a threshold voltage distribution corresponding to the erase state E may partially overlap a threshold voltage distribution corresponding to the first program state P1.

In an environment in which the threshold voltage distribution changes, if a fixed read voltage is applied to a selected word line, many errors (bit errors) may be included in read data. To reduce a bit error rate (or bit error ratio) of the read data, a method (e.g., a valley search operation) for searching for an optimal read voltage may be used. A read voltage having the smallest bit error rate in the threshold voltage distributions shown in FIG. 8 may be a voltage VOR1 corresponding to a valley between neighboring threshold voltage distributions.

In order to search for an optimal read voltage corresponding to or close to a valley between neighboring threshold voltage distributions, a first search region SR1 needs to be appropriately set within a first reference region RR1. In an example case in which the first search region SR1 is not appropriately set, when a valley search operation for searching for an optimal read voltage is performed, a portion different from a target valley may be searched for as a valley, and thus error correction fail may occur. According to an embodiment, the first reference region RR1 may be a preset region.

According to an embodiment, the reference region RR may be defined by threshold voltages when the number of memory cells is maximum in each neighboring threshold voltage distribution. For example, the first reference region RR1 may be defined by a threshold voltage V_E when the number of memory cells is maximum in a threshold voltage distribution corresponding to the erase state E and a threshold voltage V_P1 when the number of memory cells is maximum in a threshold voltage distribution corresponding to the first program state P1. A threshold voltage when the number of memory cells is maximum in the threshold voltage distribution may be referred to as a maximum threshold voltage.

According to another embodiment, the reference region RR may be defined as a preset number of memory cells. For example, the first reference region RR1 may be defined by the number of memory cells NE_on having a threshold voltage less than or equal to the maximum threshold voltage V_E and the number of memory cells NP1_on having a threshold voltage less than or equal to the maximum threshold voltage V_P1.

The number of memory cells NE_on having a threshold voltage less than or equal to the maximum threshold voltage V_E may be the number of on-cells sensed when the maximum threshold voltage V_E is applied to the selected word line as a read voltage. Accordingly, the number of memory cells NE_on having a threshold voltage less than or equal to the maximum threshold voltage V_E may be referred to as the number of erase reference on-cells.

The number of memory cells NP1_on having a threshold voltage less than or equal to the maximum threshold voltage V_P1 may be the number of on-cells sensed when the maximum threshold voltage V_P1 is applied to the selected word line as a read voltage. Accordingly, the number of memory cells NP1_on having a threshold voltage less than or equal to the maximum threshold voltage V_P1 may be referred to as a first program reference on-cell number.

A difference between the number of erase reference on-cells NE_on and the number of first program reference on-cell number NP1_on may be the number of memory cells corresponding to the first reference region RR1.

The search region SR may include a first search region SR1. The search region SR may be initially set or may be changed according to a condition. For example, the condition may be a predefined situation, such as, when an error occurs due to a preset read voltage. However, the disclosure is not limited thereto, and as such, the search region SR may be changed based on another condition. The first search region SR1 may be defined by a first start read voltage Vsl1 and a first end read voltage Vel1. According to an embodiment, the first search region SR1 may be defined by the number of memory cells. For example, the first search region SR1 may be defined by the number of memory cells Nsl_on having a threshold voltage less than or equal to the first start read voltage Vsl1 and the number of memory cells Nel_on having a threshold voltage less than or equal to the first end read voltage Vel1.

The number of memory cells Nsl_on having a threshold voltage less than or equal to the first start read voltage Vsl1 may be referred to as the number of first memory cells. The number of memory cells Nel_on having a threshold voltage less than or equal to the first end read voltage Vel1 may be referred to as the number of second memory cells. A difference between the number of first memory cells Nsl_on and the number of second memory cells Nel_on may be the number of memory cells corresponding to the first search region SR1.

Figure 9:
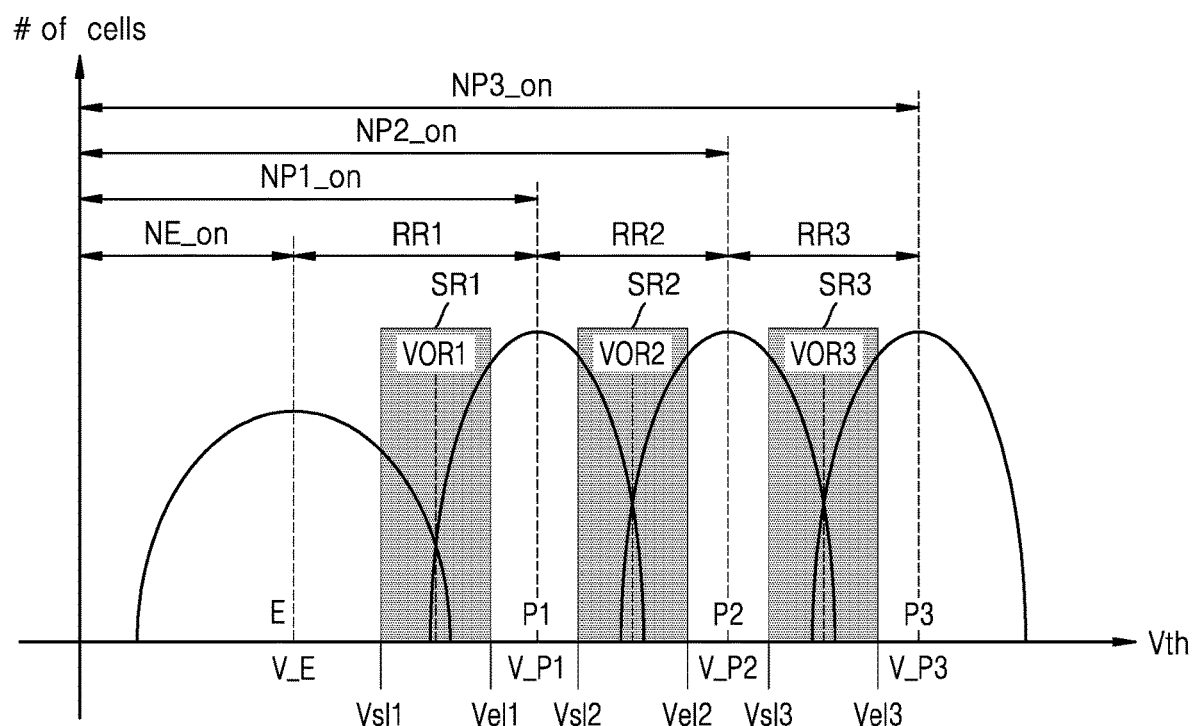
FIG. 9 is a diagram illustrating search regions and reference regions according to an embodiment.

FIG. 9 is a diagram illustrating search regions and reference regions according to an embodiment.

Referring to FIG. 9, threshold voltage distributions respectively corresponding to the erase state E of the MLC and the first program state P1, the second program state P2, and third program state P3 of the MLC are illustrated in FIG. 9.

The reference region RR may include a first reference region RR1, a second reference region RR2 and a third reference region RR3. The first reference region RR1 may be defined by the maximum threshold voltages V_E and V_P1 and/or the numbers of reference on-cells NE_on and NP1_on. The second reference region RR2 may be defined by the maximum threshold voltages V_P1 and V_P2 and/or the numbers of reference on-cells NP1_on and NP2_on. The third reference region RR3 may be defined by the maximum threshold voltages V_P2 and V_P3 and/or the numbers of reference on-cells NP2_on and NP3_on.

The search region SR may include a first search region SR1, a second search region SR2 and a third search region SR3. The first search region SR1 may be defined by read voltages (e.g., the first start read voltage Vsl1 and a first end read voltage Vel1) and/or the number of first memory cells having a threshold voltage less than or equal to the first start read voltage Vsl1 and second memory cells having a threshold voltage less than or equal to the first end read voltage Vel1. The second search region SR2 may be defined by read voltages Vsl2 and Vel2 and/or the number of first memory cells having a threshold voltage less than or equal to the second start read voltage Vsl2 and second memory cells having a threshold voltage less than or equal to the second end read voltage Vel2. The third search region SR3 may be defined by read voltages Vsl3 and Vel3 and/or the number of first memory cells having a threshold voltage less than or equal to the third start read voltage Vsl3 and second memory cells having a threshold voltage less than or equal to the third end read voltage Vel3.

In the threshold voltage distributions shown in FIG. 9, voltages VOR1, VOR2, and VOR3 may be read voltages having the smallest bit error rate.

According to an example embodiment illustrated in FIGS. 8 and 9, the reference region RR and the search region SR are defined by on-cells. However, the disclosure is not limited thereto, and as such, according to another embodiment, the reference region RR and the search region SR may be defined by the number of memory cells having a threshold voltage higher than or equal to a certain threshold voltage (i.e., off-cells).

The number of on-cells and/or off-cells according to an embodiment may be calculated as the memory controller 100 and/or the non-volatile memory 200 (e.g., the control logic circuit 220) counts on-cells or off-cells.

The number of on-cells and/or off-cells according to other embodiments may be calculated using a statistical method, such as an average. According to an embodiment, the memory controller 100 may uniformly determine the number of memory cells belonging to each state by using a randomizing technique. Referring to FIG. 8, for example, assuming that the number of memory cells is N, the number of erase reference on-cells NE_on and the first program reference on-cell number NP1_on may be N/4 and 3*(N/4), respectively. In another example, in the randomized MLC, the number of erase reference on-cells NE_on and the first to third program reference on-cell numbers NP1_on, NP2_on, and NP3_on may be determined to be N/8, 3*(N/8), 5*(N/8), and 7*(N/8), respectively. In another example, in the randomized MLC, the off-cells from the erase state to the third program state may be determined to be 7*(N/8), 5*(N/8), 3*(N/8), and N/8, respectively. The number of on-cells and off-cells according to other embodiments may be pre-stored in the first register 177.

The search region SR and the reference region RR illustrated in FIGS. 8 and 9 may be different for each word line of the 3D memory cell array.

Figure 10:
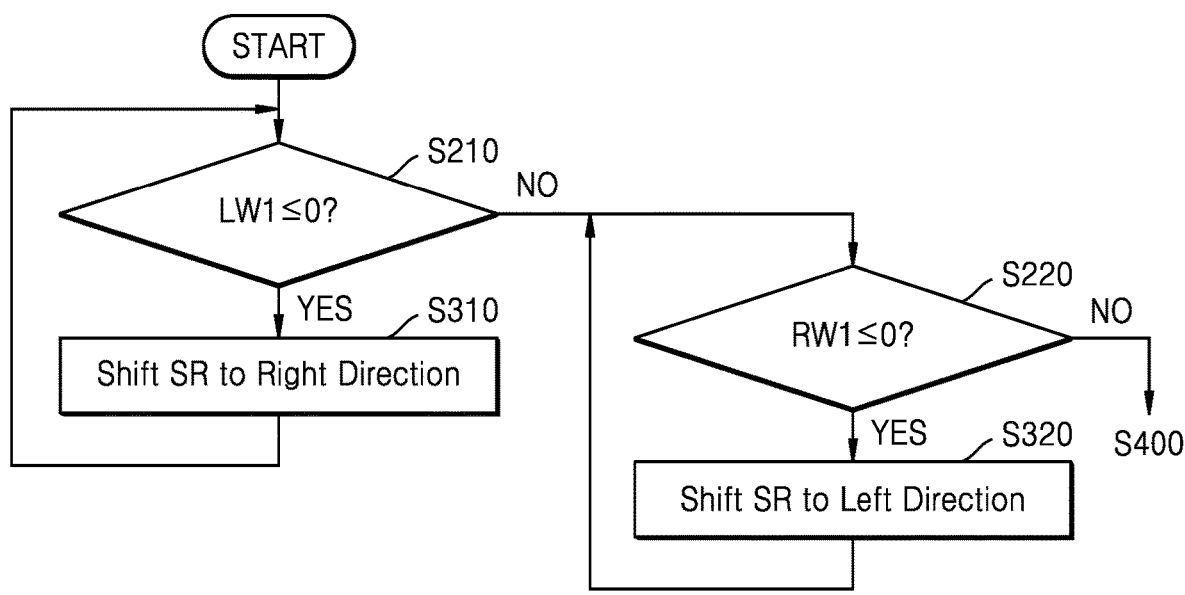
FIG. 10 is a flowchart illustrating an operating method of a memory controller according to an embodiment.
Figure 11:
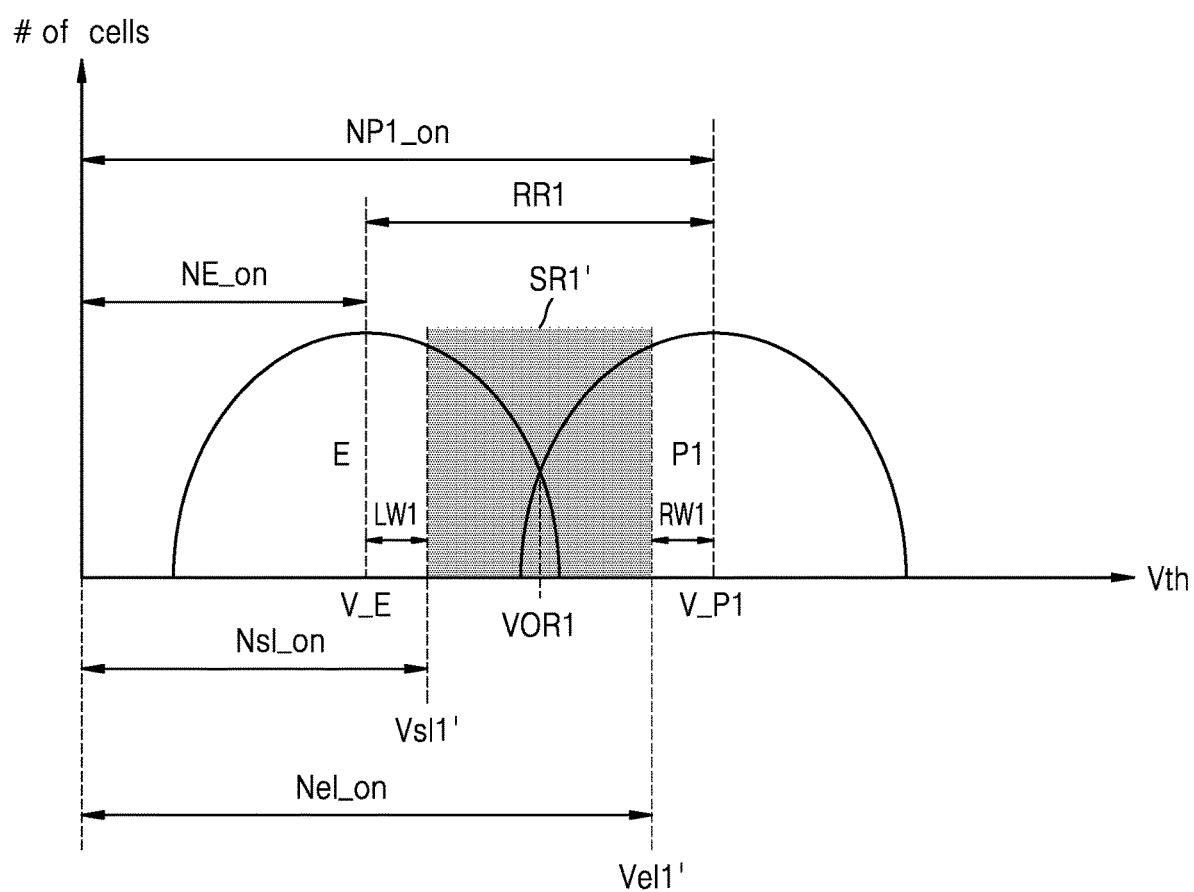
FIG. 11 is a diagram illustrating threshold voltage distributions for conceptually illustrating the operating method of FIG. 10.

FIG. 10 is a flowchart illustrating an operating method of a memory controller according to an embodiment, and FIG. 11 is a diagram illustrating threshold voltage distributions conceptually illustrating the operating method of FIG. 10.

The operating method of FIG. 10 may correspond to an embodiment of operations S200 and S300 of FIG. 7. The threshold voltage distributions of FIG. 11 are shown based on SLC. However, the disclosure is not limited thereto, and as such, according to another embodiment, the operating method of FIG. 10 may also be applied to the MLC, TLC, QLC, and the like. According to an embodiment, it is assumed that the search region SR of FIG. 10 is the first search region SR' of FIG. 11.

Referring to FIGS. 10 and 11, in operation S210, the method may include determining whether a first width LW1 is less than or equal to '0'. For example, the memory controller 100 determines whether a first width LW1 is less than or equal to '0'. The first width LW1 may be a difference between the number of memory cells Nsl_on having a threshold voltage less than or equal to the first start read voltage Vsl1' and the number of first reference memory cells. The number of first reference memory cells may be the erase reference number of on-cell number NE_on.

In operation S310, the method may include shifting the first search region SR1' to the right based on the first width LW1 being less than or equal to '0'. For example, when the first width LW1 is less than or equal to '0' (S210, YES), the memory controller 100 increases a first start read voltage Vsl1' and a first end read voltage Vel1' by a shift voltage, thereby shifting the first search region SR1' to the right. The shift voltage may be predetermined or set in advance. The right side may be an example of the first direction or the second direction.

In S220, the method may include determining whether the second width RW1 is less than or equal to '0' based on the first width LW1 being greater than '0'. For example, in a case in which the first width LW1 is greater than '0' (S210, NO), the memory controller 100 determines whether the second width RW1 is less than or equal to '0'. The second width RW1 may be a difference between the number of memory cells Nel_on having a threshold voltage less than or equal to the first end read voltage Vel1' and the number of second reference memory cells. The number of second reference memory cells may be a first program reference on-cell number NP1_on.

In operation S320, the method may include shifting the first search region SR1' to the left based on the second width RW1 is less than or equal to '0'. For example, when the second width RW1 is less than or equal to '0' (S220, YES), the memory controller 100 reduces the first start read voltage Vsl1' and the first end read voltage Vel1' by the shift voltage, thereby shifting the first search region SR1' to the left (S320). The left side may be an example of the first direction or the second direction. For example, if the right side is the first direction, the left side may be the second direction.

Operations S210 and S310 may be repeated until the first width LW1 is greater than '0'. Also, operations S220 and S320 may be repeated until the second width RW1 is greater than '0'.

When the second width RW1 is greater than '0' (S220, NO), operation S400 of FIG. 7 is performed. Meanwhile, the order of operations S210 and S220 of FIG. 10 may be changed. Although the illustrate in FIGS. 10 and 11 include zero ('0') as the threshold value to making the comparison, the disclosure is not limited thereto, and as such, according to another amendment, a value other than '0' may be used.

Figure 12A:
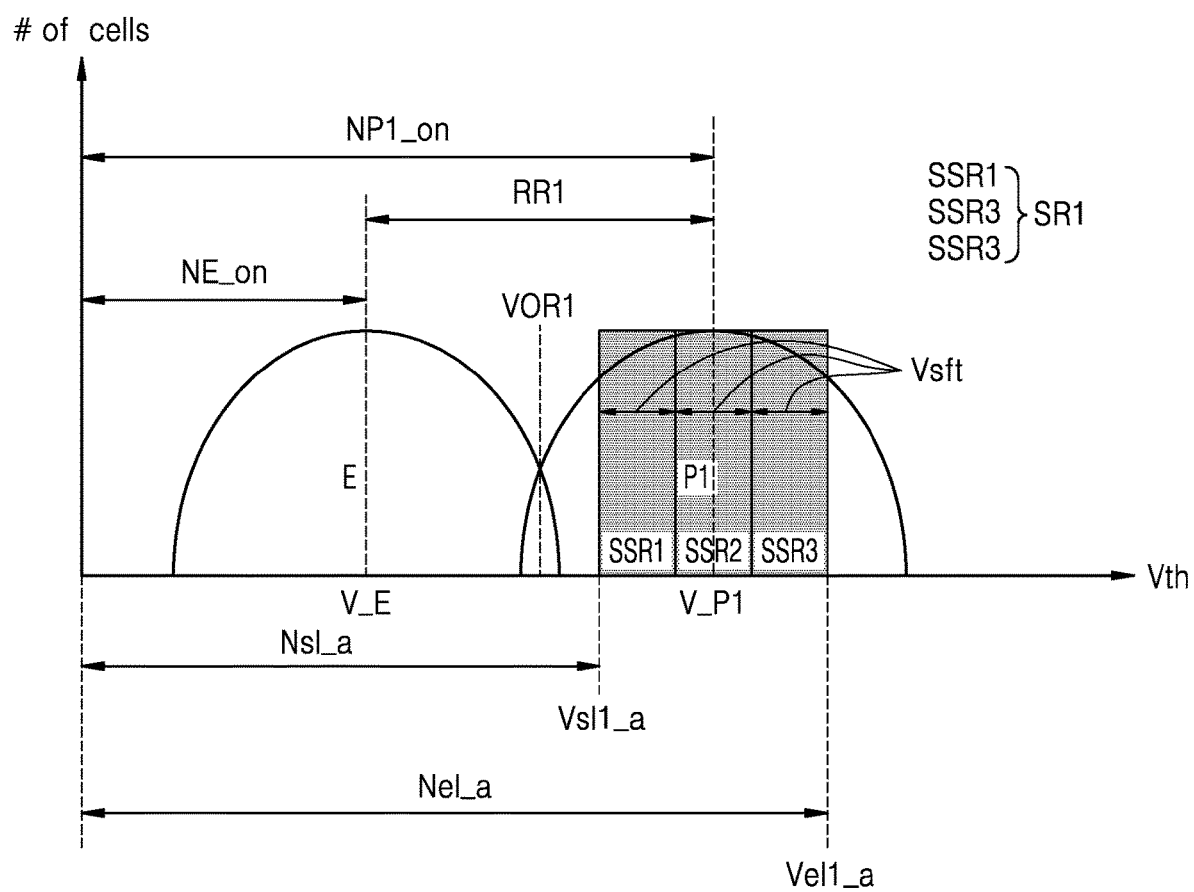
FIGS. 12A, 12B, and 12C are diagrams illustrating embodiments of moving a search region according to the disclosure.
Figure 12B:
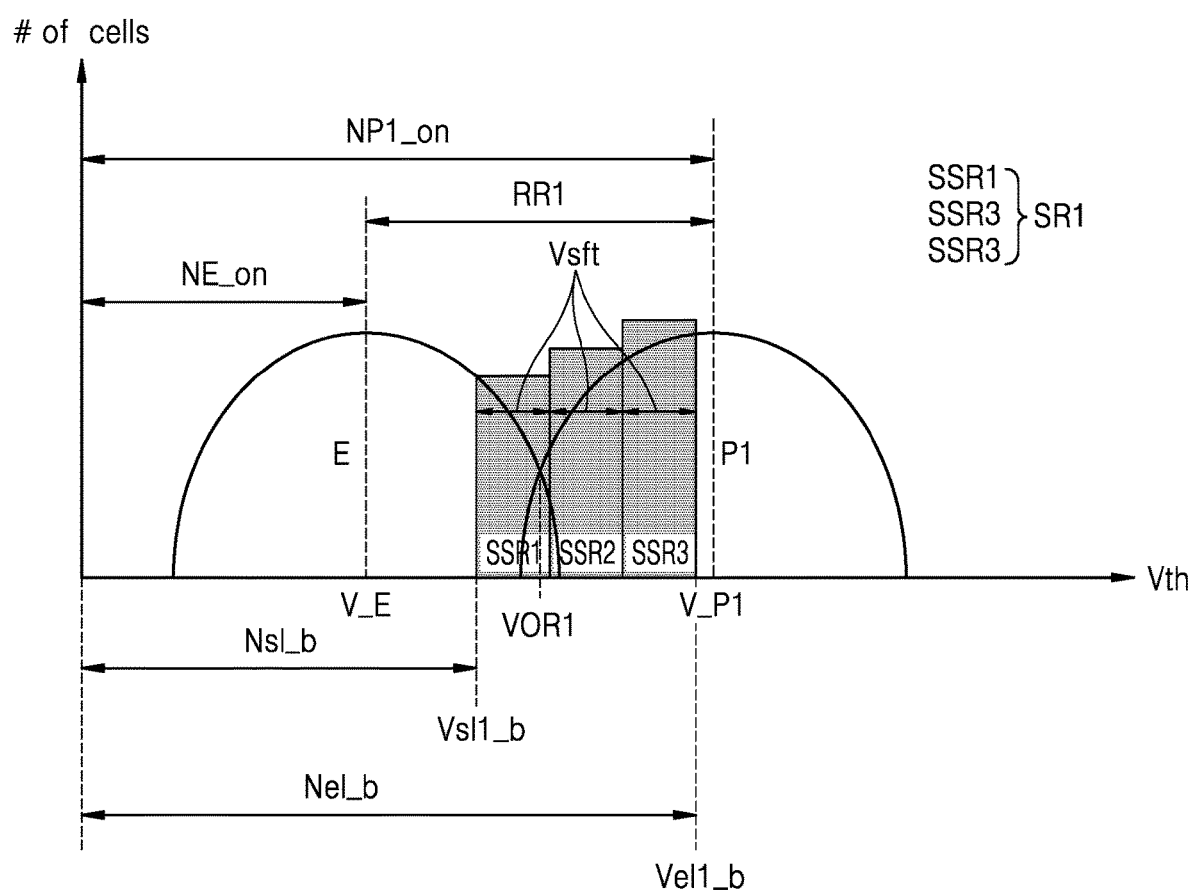
Figure 12C:
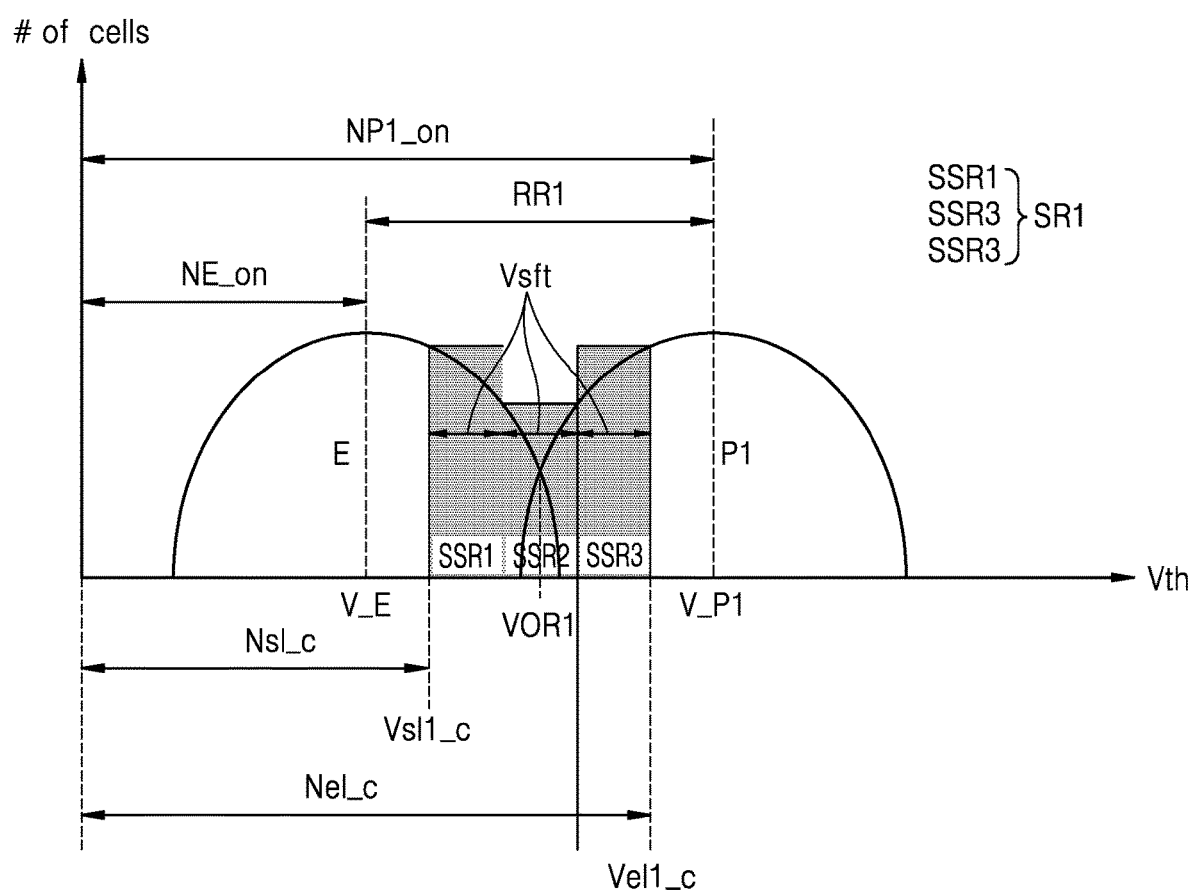

FIGS. 12A, 12B, and 12C are diagrams illustrating embodiments of moving a search region according to the disclosure.

Referring to FIGS. 10, 11, and 12A, the first search region SR1' may not belong to the first reference region RR1. Because the number of second memory cells Nel_a is greater than the number of second reference memory cells (e.g., the number of on-cells NP1_on based on the first program), the first start read voltage Vsl1_a and the first end read voltage Vel1_a may be moved in a certain direction (e.g., a leftward direction) by the shift voltage Vsft, and thus, the first search region SR1 may be shifted as shown in FIG. 12B. According to an embodiment, the shift voltage Vsft may be a voltage trisecting a difference (or an interval) between the first start read voltage Vsl1_a and the first end read voltage Vel1_a. However, the disclosure is not limited thereto.

Referring to FIG. 12B, because the number of second memory cells Nel_b is less than the number of first program reference on-cells NP1_on, the changed first search region SR1 may belong to the first reference region RR1. Accordingly, operation S400 of FIG. 7 is performed, and the memory controller 100 may search for an optimal read voltage by using the first start read voltage Vsl_b and the first end read voltage Vel_b belonging to the first reference region RR1.

According to an embodiment, the memory controller 100 may divide the first search region SR1 between the first start read voltage Vsl_b and the first end read voltage Vel_b into at least two sub-search regions. For example, the first search region SR1 may include a first sub-search region SSR1, a second sub-search region SSR2, and a third sub-search region SSR3. The sub-search regions may be defined by different voltages from a start read voltage to an end read voltage, respectively. The number of sub-search regions is three as illustrated in FIGS. 12A, 12B, and 12C, but is not limited thereto.

The memory controller 100 may count the number of memory cells belonging to each sub-search region and search for an optimal read voltage using each count value. For example, the number of memory cells belonging to each of the first to third sub-search regions SSR1, SSR2, and SSR3 may be counted. The number of memory cells in the first sub-search region SSR1 may be the number of memory cells having a threshold voltage between the first start read voltage Vsl_b and the 'first start read voltage Vsl_b+shift voltage'. The number of memory cells in the second sub-search region SSR2 may be the number of memory cells having a threshold voltage between the 'first start read voltage (Vsl_b)+shift voltage (Vsft)' and 'first start read voltage (Vsl_b)+2*shift voltage (Vsft)'. The number of memory cells in the third sub-search region SSR3 may be the number of memory cells between the 'first start read voltage (Vsl_b)+2*shift voltage (Vsft)' and 'first end read voltage (Vel_b)'. The number of memory cells in each sub-search region may be counted using on cells or off-cells.

According to an embodiment, if the number of memory cells in the second sub-search region SSR2 provided in the middle among the first to third sub-search regions SSR1, SSR2, and SSR3 is not the minimum, the memory controller 100 may move the first to third sub-search regions SSR1, SSR2, and SSR3 in a certain direction (e.g., a leftward direction) by the shift voltage Vsft to search for the optimal read voltage again. The first to third sub-search regions SSR1, SSR2, and SSR3 may be shifted as shown in FIG. 12C.

Referring to FIG. 12C, the memory controller 100 may count the number of memory cells in each of the first to third sub-search regions SSR1, SSR2, and SSR3 and determine whether the number of memory cells in the second sub-search region SSR2 is the minimum. Because the number of memory cells in the second sub-search region SSR2 is the minimum in FIG. 12C, the read voltage (e.g., the 'first start read voltage Vsl_c+shift voltage V' or the 'first start read voltage (Vsl_c)+2*shift voltage (Vsft)') at this time may be determined (or set) as an optimal read voltage.

Figure 13:
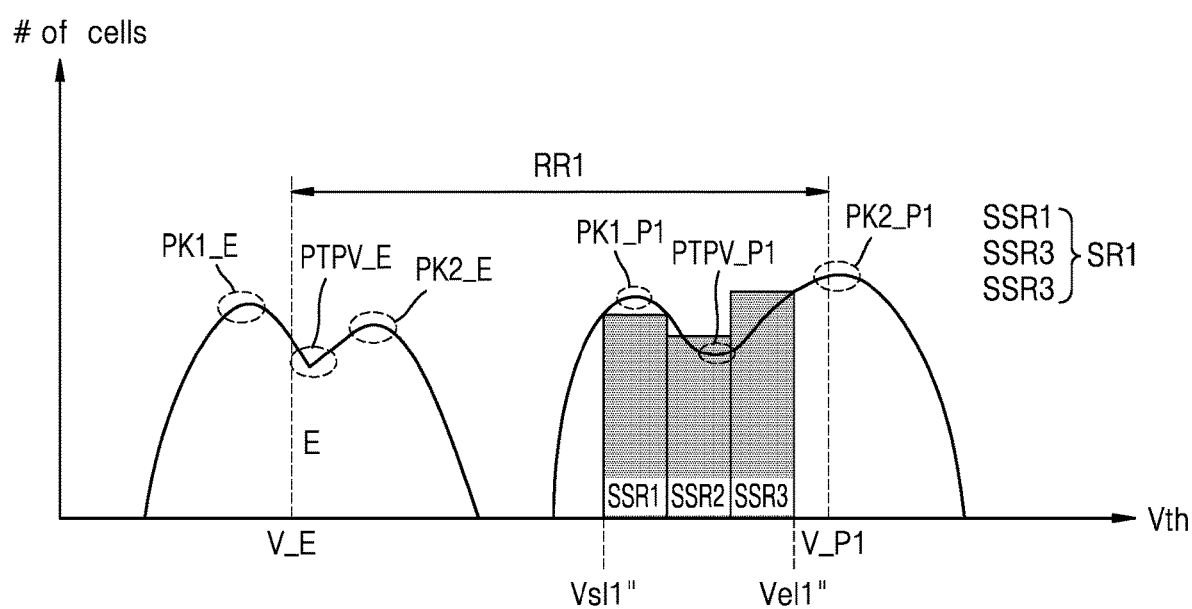
FIG. 13 is a diagram illustrating a search region and a reference region in a multi-peak threshold voltage distribution according to an embodiment.

FIG. 13 is a diagram illustrating a search region and a reference region in a multi-peak threshold voltage distribution according to an embodiment.

Referring to FIG. 13, when a program operation is performed, an ISPP may be adjusted to satisfy performance requirements. For example, the ISPP may be adjusted to satisfy performance requirements set by a user of the memory device. Accordingly, threshold voltage distributions of memory cells may have a multi-peak shape. Referring to FIG. 13, for example, when a program operation is performed on the SLC, the threshold voltage distribution corresponding to the erased state E may have first and second peaks PK1_E and PK2_E and an inter-peak valley PTPV_E. Similarly, the threshold voltage distribution corresponding to the first program state P1 may also have first and second peaks PK1_P1 and PK2_P1 and an inter-peak valley PTPV_P1. FIG. 13 shows that the number of peaks in the threshold voltage distribution is 2 and the number of valleys between peaks is 1, but are not limited thereto. As such, a distribution form in which two or more peaks occur in the threshold voltage distribution may be referred to as a multi-peak form. In this case, a region including at least one of the peaks and valleys between the peaks may be referred to as a multi-peak region.

The first search region SR1 may belong to the first reference region RR1, and the first search region SR1 belonging to the first reference region RR1 may belong to the multi-peak region of a certain threshold voltage distribution (e.g., a threshold voltage distribution corresponding to the first program state P1). Referring to FIG. 13, for example, the first peak PK1_P1 and the inter-peak valley PTPV_P1 may be located between a first start read voltage Vsl1" and a first end read voltage Vel1".

Even when the first search region SR1 belongs to the multi-peak region, the number of memory cells in the second sub-search region SSR2 may be minimal as described above with reference to FIG. 12C. Here, because the searched read voltage cannot differentiate between the erase state E and the first program state P1, read fail may occur. Therefore, when the first search region SR1 belongs to the multi-peak region, it is necessary to change the first search region SR1 to prevent read fail.

Figure 14:
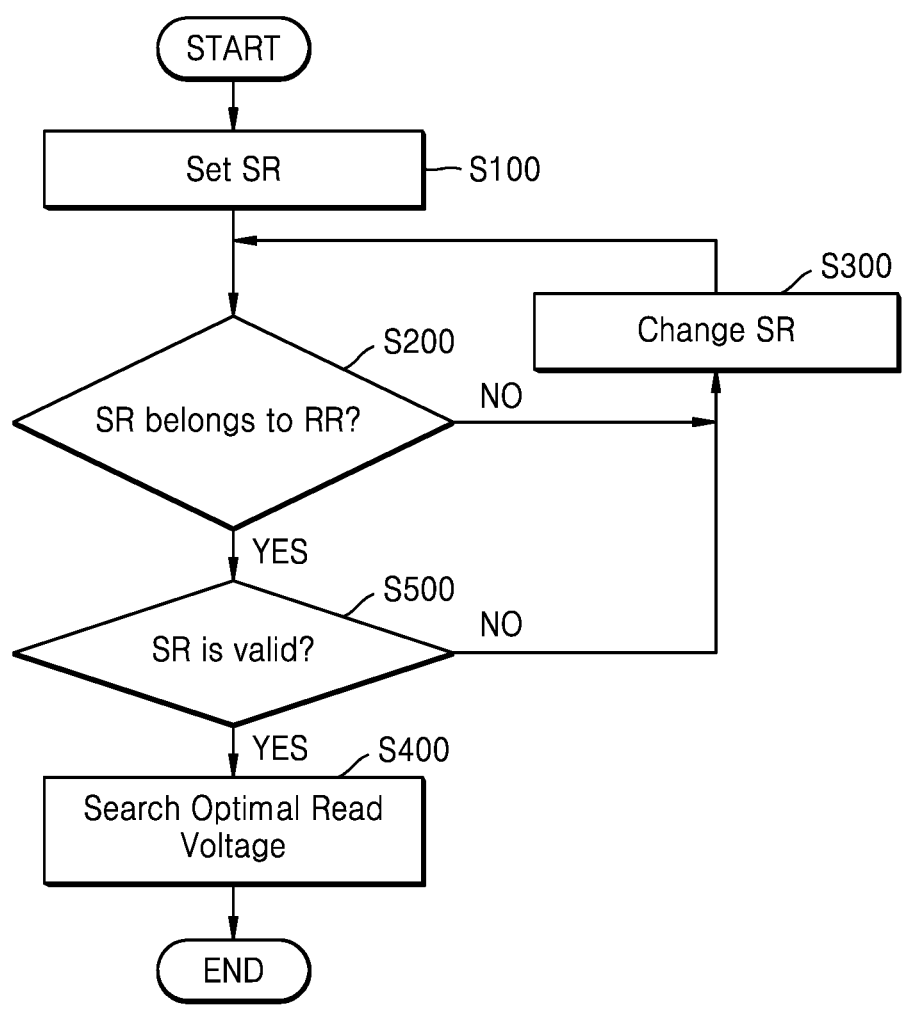
FIG. 14 is a flowchart illustrating an operating method of a memory controller according to an embodiment.

FIG. 14 is a flowchart illustrating an operating method of a memory controller according to an embodiment.

Referring to FIG. 14, operations S100, S200, and S400 may be the same as those described above with reference to FIG. 7.

For example, in an example case in which the search region SR does not belong to the reference region (S200, NO), the memory controller 100 may change the search region SR. Referring to FIG. 13, for example, the memory controller 100 may calculate the first start read voltage Vsl1" and the first end read voltage Vel1" by the shift voltage Vsft to move the first search region SR.

On the other hand, in an example case in which the search region SR does belong to the reference region (S200, YES), in operation S500, the method may include validating the search region SR. For example, in a case in which the search region SR belongs to the reference region RR (S200, YES), the memory controller 100 validates the search region. According to an embodiment, determining whether to validate the search region SR may include determining whether the search region SR does not belong to a multi-peak region of a threshold voltage distribution corresponding to a certain state. Referring to FIG. 13, for example, the memory controller 100 may determine whether the first search region SR1 belongs to or does not belong to a multi-peak region (e.g., PK1_P1, PTPV_P1, and PK2_P1) of a single threshold voltage distribution.

In an example case in which the search region SR fails validation (S500, NO), operation S300 is performed. On the other hand, in an example case in which the search region SR passes validation (S500, YES), operation S400 is performed. For example, in the example case in which the search region SR passes validation (S500, YES), in operation S400, the method may include searching for optimal read voltage.

Figure 15A:
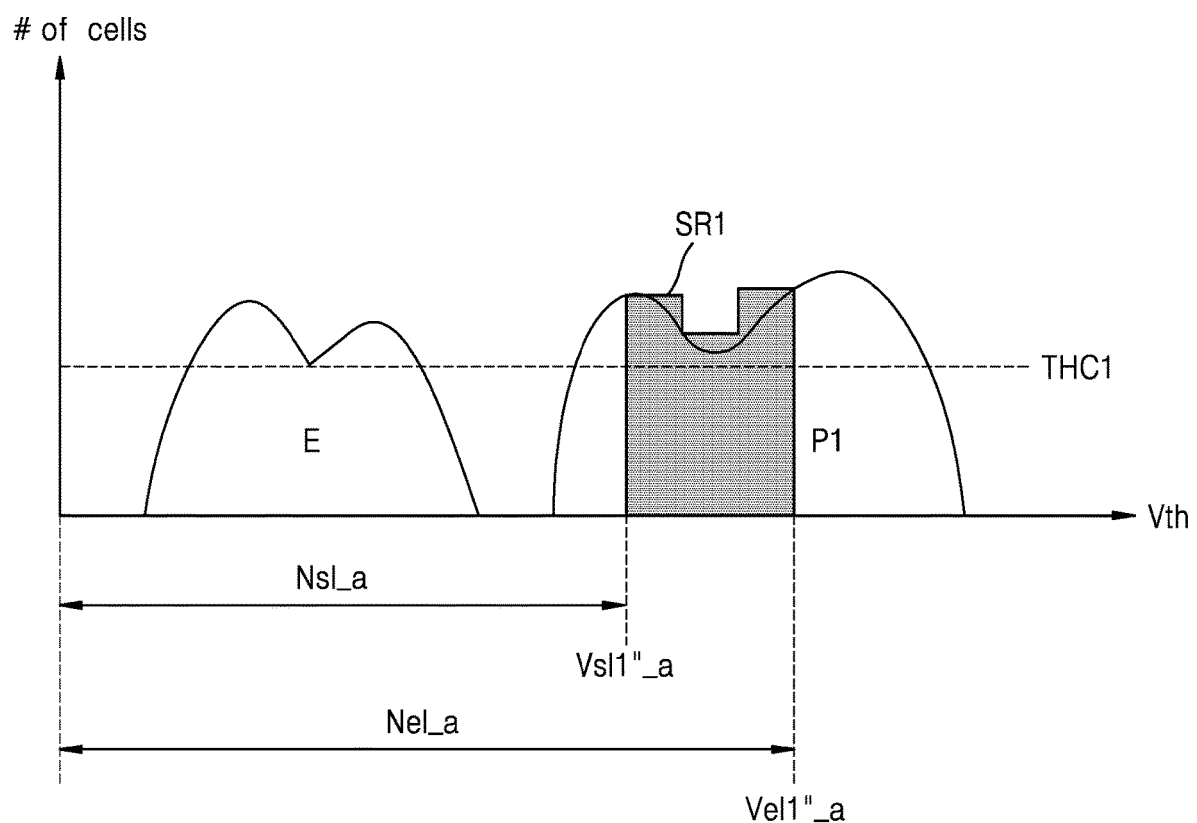
FIGS. 15A and 15B are diagrams illustrating embodiments of operation S500 in the operating method of FIG. 14.
Figure 15B:
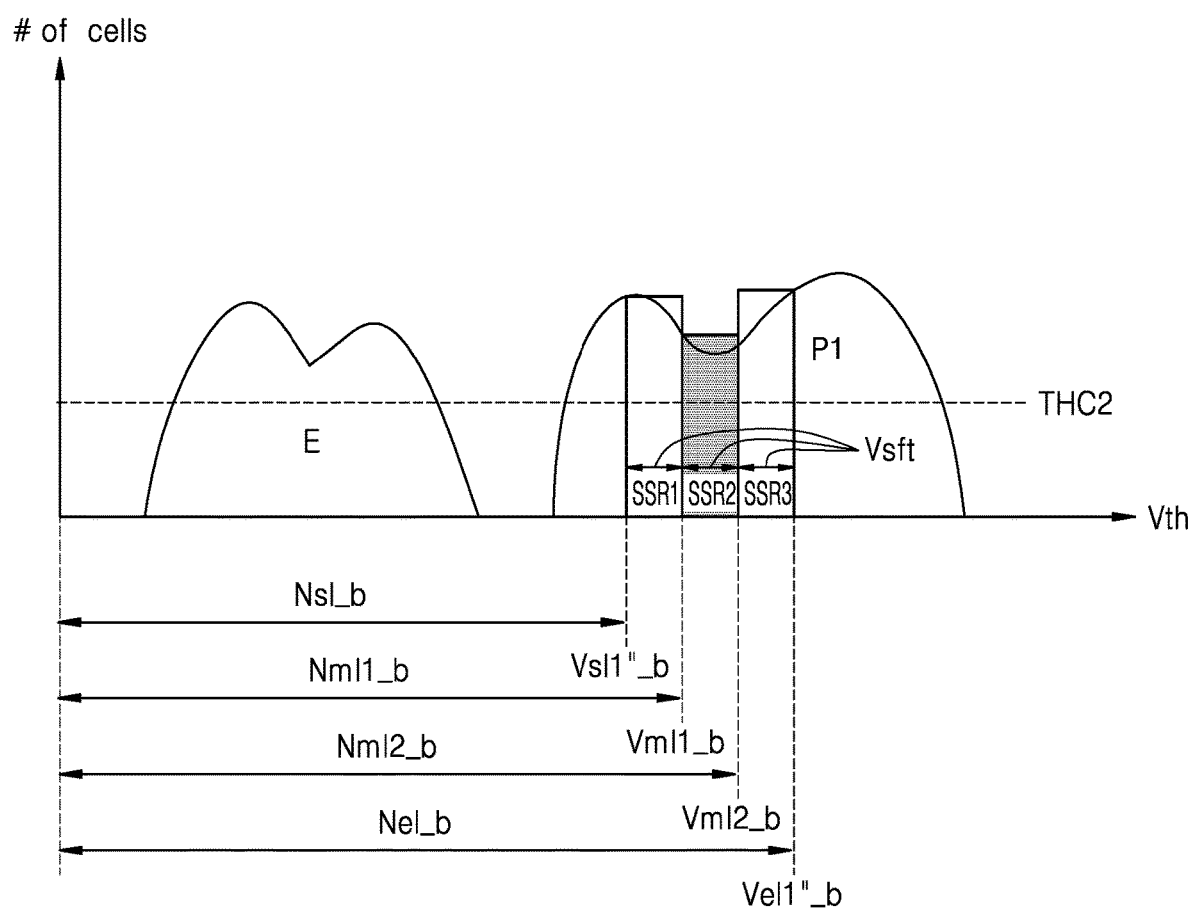

FIGS. 15A and 15B are diagrams illustrating embodiments of operation S500 in the operating method of FIG. 14.

According to an embodiment, the memory controller 100 may validate the search region SR using the number of memory cells in the search region SR. The number of memory cells in the search region SR may be the number of memory cells having threshold voltages from the start read voltage to the end read voltage.

Referring to FIG. 15A, for example, the number of memory cells Nsl_a having a threshold voltage less than or equal to a first start read voltage Vsl1"_a may be counted. Also, the number of memory cells (Nel_a) having a threshold voltage less than or equal to the first end read voltage (Vel1"_a) may be counted. The number of memory cells in the first search region SR1 may correspond to a difference between the numbers of memory cells Nsl_a and Nel_a.

Referring to FIG. 15A, the memory controller 100 may compare the number of memory cells (e.g., 'Nel_a-Nsl_a') in the first search region SR1 with a first validation reference number THC1. When the number of memory cells in the first search region SR1 is greater than the first validation reference number THC1, the memory controller 100 may determine that the first search region SR1 belongs to the multi-peak region. In an example case in which the number of memory cells in the first search region SR1 is less than or equal to the first validation reference number THC1, the memory controller 100 may determine that the first search region SR1 does not belong to the multi-peak region.

According to another embodiment, the memory controller 100 may count the number of memory cells having threshold voltages from a start read voltage of a selected sub-search region to an end read voltage of the selected sub-search region, among a plurality of sub-search regions included in the search region SR.

Referring to FIG. 15B, for example, the first search region SR1 may include first to third sub-search regions SSR1, SSR2, and SSR3. The selected sub-search region may be the second sub-search region SSR2. The number of memory cells having threshold voltages from a start read voltage Vml1_b to an end read voltage Vml2_b of the second sub-search region SSR2 may correspond to a difference between the numbers of on-cells (e.g., 'Nml2_b-Nml1_b').

Referring to FIG. 15B, the memory controller 100 may compare the number of memory cells (e.g., 'Nml2_b-Nml1_b') in the second sub-search region SSR2 with a second validation reference number THC2. When the number of memory cells in the second sub-search region SSR2 is greater than the second validation reference number THC2, the memory controller 100 may determine that the first search region SR1 belongs to the multi-peak region. If the number of memory cells in the second sub-search region SSR2 is less than or equal to the second validation reference number THC2, the memory controller 100 may determine that the first search region SR1 does not belong to the multi-peak region.

In the embodiment illustrated in FIG. 15B, the memory controller 100 may more accurately detect the multi-peak region based on the number of memory cells in each of the first to third sub-search regions SSR1, SSR2, and SSR3. For example, the number of memory cells in the first sub-search region SS1 (e.g., 'Nml1_b-Nsl_b'), the number of memory cells in the second sub-search region SSR2 (e.g., 'Nml2_b-Nml1_b'), and the number of memory cells in the third sub-search region SSR3 (e.g., 'Nel_b-Nml2_b') may be counted. Also, the memory controller 100 may infer the shape of the threshold voltage distribution using the number of memory cells in each sub-search region. When the number of memory cells in the second sub-search region SSR2 (e.g., 'Nml2_b-Nml1_b') is less than the number of memory cells in the first sub-search region SS1 (e.g., 'Nml1_b-Nsl_b') and the number of memory cells in the third sub-search region SSR3 (e.g., 'Nel_b-Nml2_b'), the multi-peak region may be detected.

According to an embodiment, the first validation reference number THC1 may be greater than the second validation reference number THC2. However, the disclosure is not limited thereto, and in other embodiments, the first validation reference number THC1 may be equal to the second validation reference number THC2.

Although the embodiments of FIGS. 15A and 15B are described based on on-cells, the embodiments of FIGS. 15A and 15B may also be applied based on off-cells in other embodiments.

As described above, there is an effect of improving correction power of less read estimation (LRE).

Figure 16A:
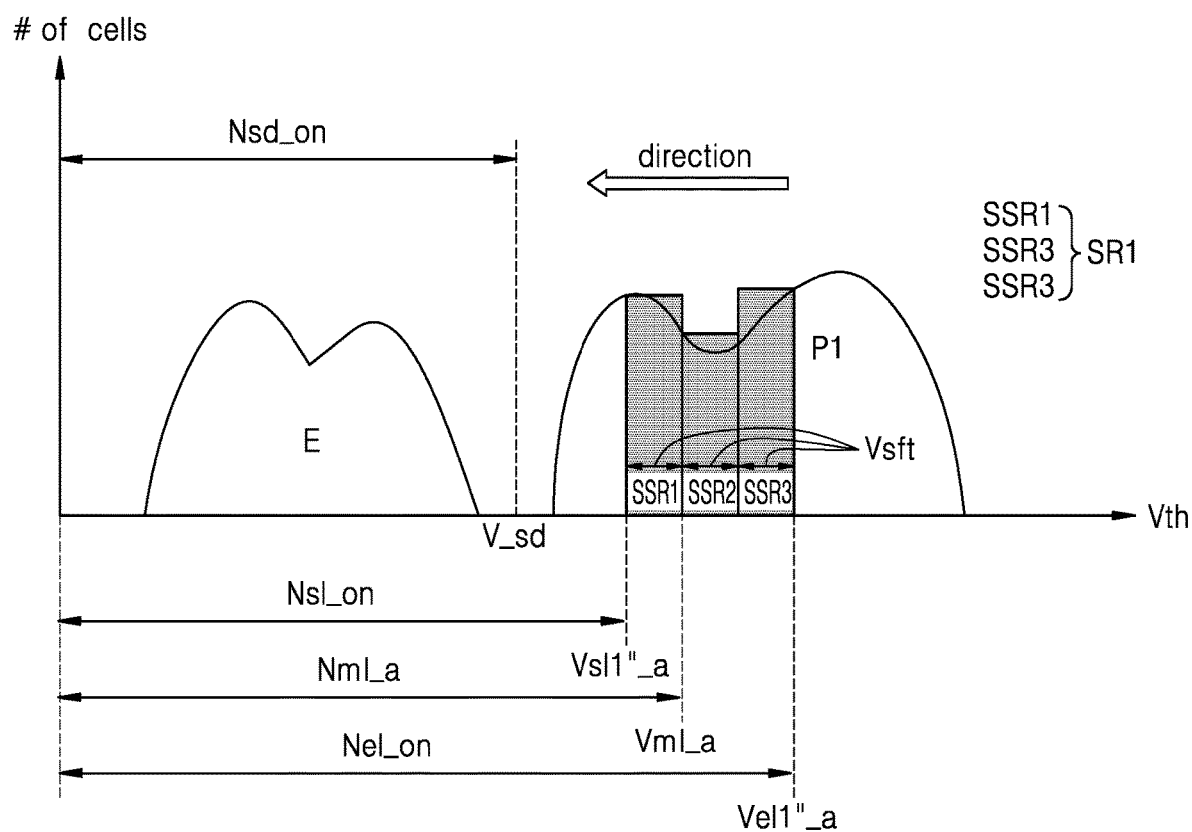
FIGS. 16A and 16B are diagrams illustrating embodiments of determining a change direction for changing a search region in which validation has failed in the operating method of FIG. 14.
Figure 16B:
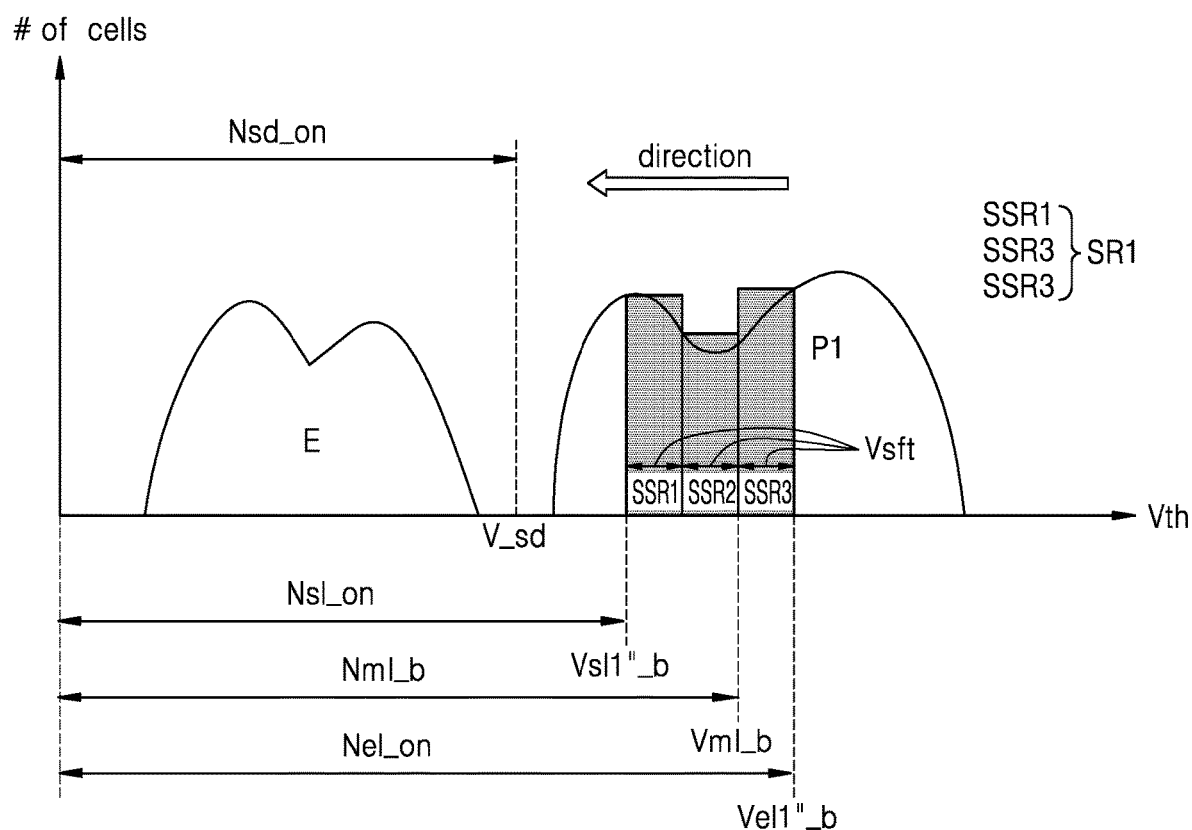

FIGS. 16A and 16B are diagrams illustrating embodiments of determining a change direction for changing a search region which fails validation in the operating method of FIG. 14. That is, FIGS. 16A and 16B are diagrams illustrating embodiments of operation S300 performed when the search region SR fails validation (S500, NO).

According to an embodiment, when the search region SR belongs to the multi-peak region, the memory controller 100 may determine a change direction ESD for changing the search region SR.

Referring to FIG. 16A, for example, in a case in which the first search region SR1 belongs to the multi-peak region, the memory controller 100 may count the number of memory cells based on a certain read voltage Vml_a between a first start read voltage Vsl1"_a and a first end read voltage Vel1"_a. For example, the number of memory cells Nml_a having a threshold voltage less than or equal to the read voltage Vml_a may be counted. The memory controller 100 may compare the number of memory cells Nml_a with a first reference number Nsd_on. When the number of memory cells Nml_a is greater than the first reference number Nsd_on, the memory controller 100 may determine the change direction ESD as a first direction (e.g., the leftward direction). When the number of memory cells Nml_a is less than the first reference number Nsd_on, the memory controller 100 may determine the change direction ESD as a second direction (e.g., the rightward direction).

Referring to FIG. 16B, for example, in a case in which the first search region SR1 belongs to the multi-peak region, the number of memory cells Nml_b may be counted based on another read voltage Vml_b between the first start read voltage Vsl1"_b and the first end read voltage Vel1"_b. The memory controller 100 may compare the number of memory cells Nml_b with the first reference number Nsd_on, and calculate the first start read voltage Vsl1"_b and the first end read voltage Vel1"_b by the shift voltage Vsft according to a comparison result, thereby moving the first search region SR1.

The embodiments of FIG. 16A or 16B may be applied even when the search region SR belongs to the multi-peak region of the threshold voltage distribution corresponding to the erase state E.

The first reference number Nsd_on according to some embodiments may be the number of memory cells having a threshold voltage less than or equal to the read voltage V_sd in randomized memory cells. When the number of memory cells is N, the number of states is SN, and the lead point number is RPN (RPN is an integer greater than or equal to 1 and less than or equal to SN), the first reference number Nsd_on may be RPN*N/(SN). For example, in the SLC, the first reference number Nsd_on may be N/2. For another example, in the MLC, the first reference number Nsd_on may be N/4, 2*(N/4), or 3*(N/4). In the TLC, the first reference number Nsd_on may be determined to be N/8, 2*(N/8), 3*(N/8), 4*(N/8), 5*(N/8), 6*(N/8) or 7*(N/8). The reference number according to an embodiment may be stored in the second register 179.

Although the embodiments of FIGS. 16A and 16B are described based on on-cells, the embodiments of FIGS. 16A and 16B may also be applied based on off-cells in other embodiments.

Figure 17A:
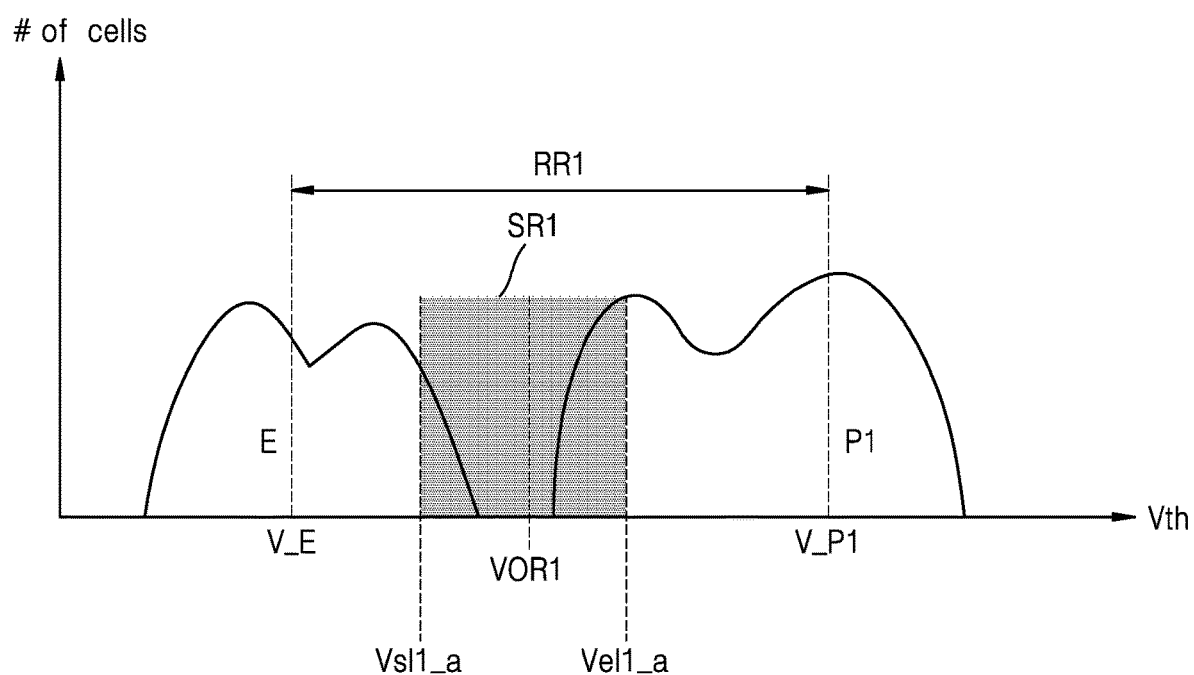
FIGS. 17A and 17B are diagrams illustrating embodiments of a changed search region.
Figure 17B:
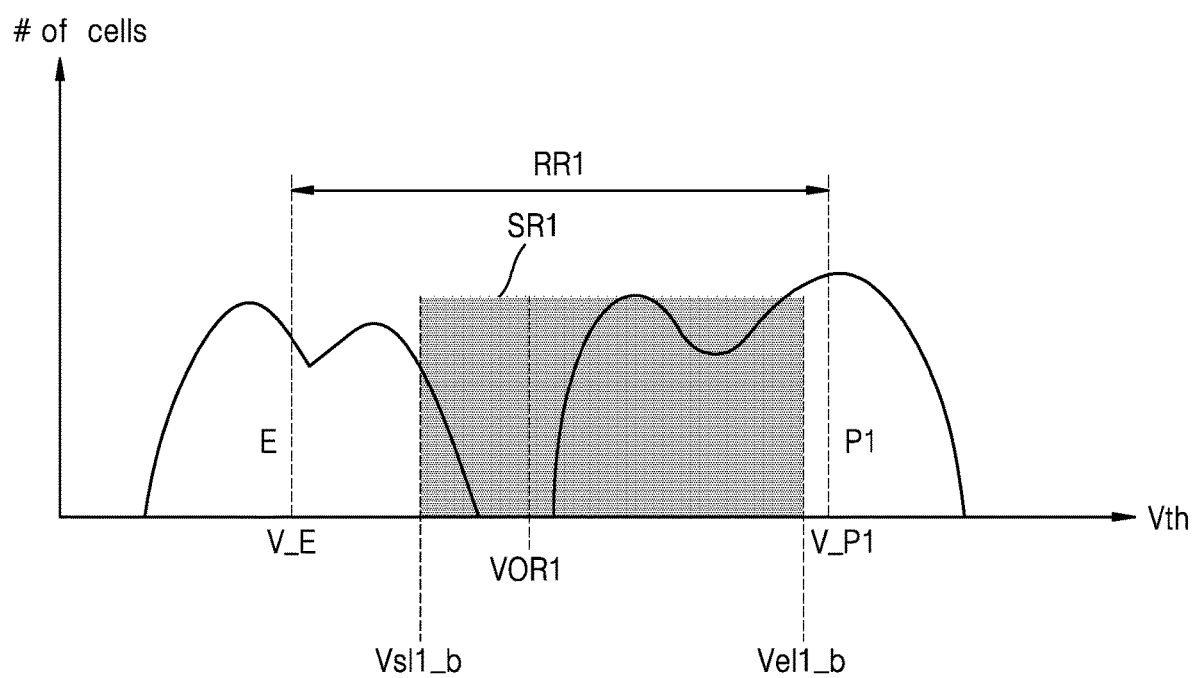

FIGS. 17A and 17B are diagrams illustrating embodiments of a changed search region.

In embodiments, when the search region SR belongs to the multi-peak region and the change direction ESD is determined, the memory controller 100 may move the search region SR in the change direction ESD by calculating the start read voltage and the end read voltage by the shift voltage Vsft.

Referring to FIG. 16A, for example, the memory controller 100 may move the first search region SR1 in the first direction (e.g., the leftward direction) by reducing the first start read voltage Vsl1"_a and the first end read voltage Vel1"_a by the shift voltage Vsft.

In the first search region SR1 moved as shown in FIG. 17A, the memory controller 100 may search for an optimal read voltage VOR1 by using the first start read voltage Vsl1_a and the first end read voltage Vel1_a. According to the embodiment of FIG. 17A, the read voltage may be more accurately searched.

For example, different from those shown in FIGS. 16A and 16B, when the number of memory cells Nml_an or Nml_b is less than the first reference number Nsd_on, such as belonging to the multi-peak region of the threshold voltage distribution corresponding to the erase state E, the memory controller 100 may move the first search region SR1 in the second direction (e.g., the rightward direction) by increasing the first start read voltage Vsl1"_a and the first end read voltage Vel1"_a by the shift voltage Vsft.

According to another embodiment, when the search region SR belongs to the multi-peak region and the change direction ESD is determined, the memory controller 100 may expand the search region SR in the change direction ESD by calculating any one of the start read voltage and the end read voltage by the shift voltage.

Referring to FIG. 16A, for example, the memory controller 100 may expand the first search region SR1 in the first direction (e.g., the leftward direction) by reducing the first start read voltage Vsl1"_a by the shift voltage Vsft.

As shown in FIG. 17B, in the expanded first search region SR1, the memory controller 100 may search for an optimal read voltage VOR1 by using the first start read voltage Vsl1_b and the first end read voltage Vel1_b. According to the embodiment of FIG. 17B, a read voltage may be searched more quickly.

For example, different from those shown in FIGS. 16A and 16B, when the number of memory cells Nml_an or Nml_b is less than the first reference number Nsd_on, the memory controller 100 may expand the first search region SR1 in the second direction (e.g., a rightward direction) by increasing the first end read voltage Vel1"_a by the shift voltage Vsft.

Figure 18:
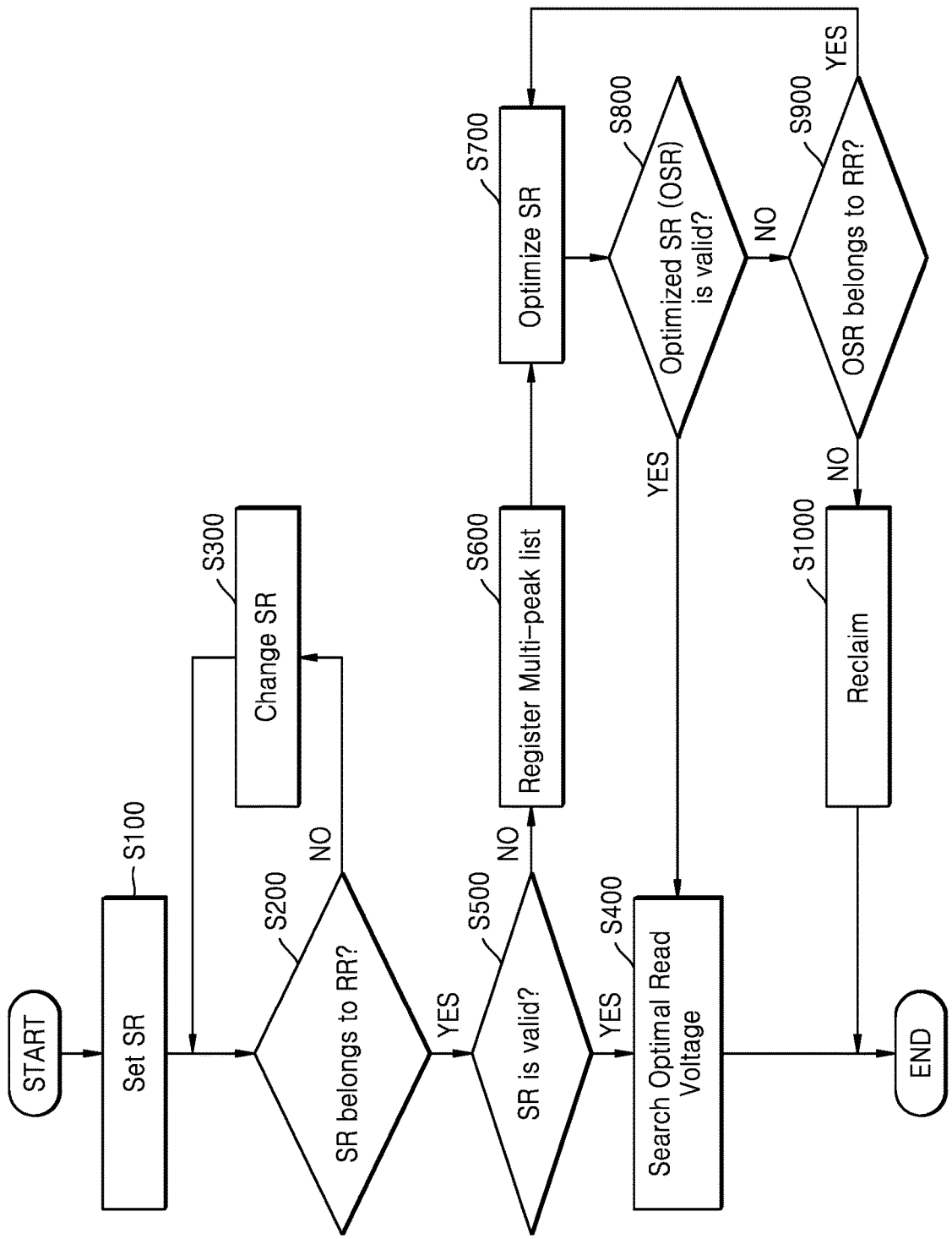
FIG. 18 is a flowchart illustrating an operating method of a memory controller according to an embodiment.

FIG. 18 is a flowchart illustrating an operating method of a memory controller according to an embodiment.

Referring to FIG. 18, operations S100, S200, S300, S400, and S500 are the same as those described above with reference to FIG. 14.

In an example case in which the search region SR fails validation (S500, NO), the search region validation circuit 173 registers information on word lines to which memory cells having a multi-peak distribution are connected to the multi-peak list MPL of the second register 179 (S600). According to an embodiment, the search region validation circuit 173 may store information on a word line in which a multi-peak distribution occurs and each memory block including the corresponding word line in the multi-peak list MPL of the second register 179.

The search region determination circuit 171 optimizes the search region SR based on the validation information VR (S700). Optimizing the search region SR may be shifting the search region SR or expanding the search region SR. For example, the operation performed in operation S700 may correspond to the embodiments shown in FIGS. 16A, 16B, 17A, and 17B.

The search region validation circuit 173 validates the optimized search region (OSR) (S800). In an example case in which the optimized search region OSR passes validation (S800, YES), operation S400 is performed.

In an example case in which the optimized search region OSR fails validation (S800, NO), the search region determination circuit 171 determines whether the optimized search region OSR belongs to the reference region RR (S900). In an example case in which the optimized search region OSR belongs to the reference region RR (S900, YES), operation S700 is performed.

In an example case in which the optimized search region OSR does not belong to the reference region RR (S900, NO), the search region validation circuit 173 performs reclaim (S1000). According to an embodiment, for example, the search region validation circuit 173 may store the memory block including memory cells having a multi-peak distribution in a reclaim block list RCM_BLK of the second register 179 as a reclaim target. Also, during reclaim, the memory controller 100 may provide a write command and an address to the non-volatile memory 200 so that all data stored in the selected memory block selected as the reclaim target is stored in a free memory block. In addition, the memory controller 100 may provide an erase command and an address to the non-volatile memory 200 to erase the selected memory block.

Figure 19:
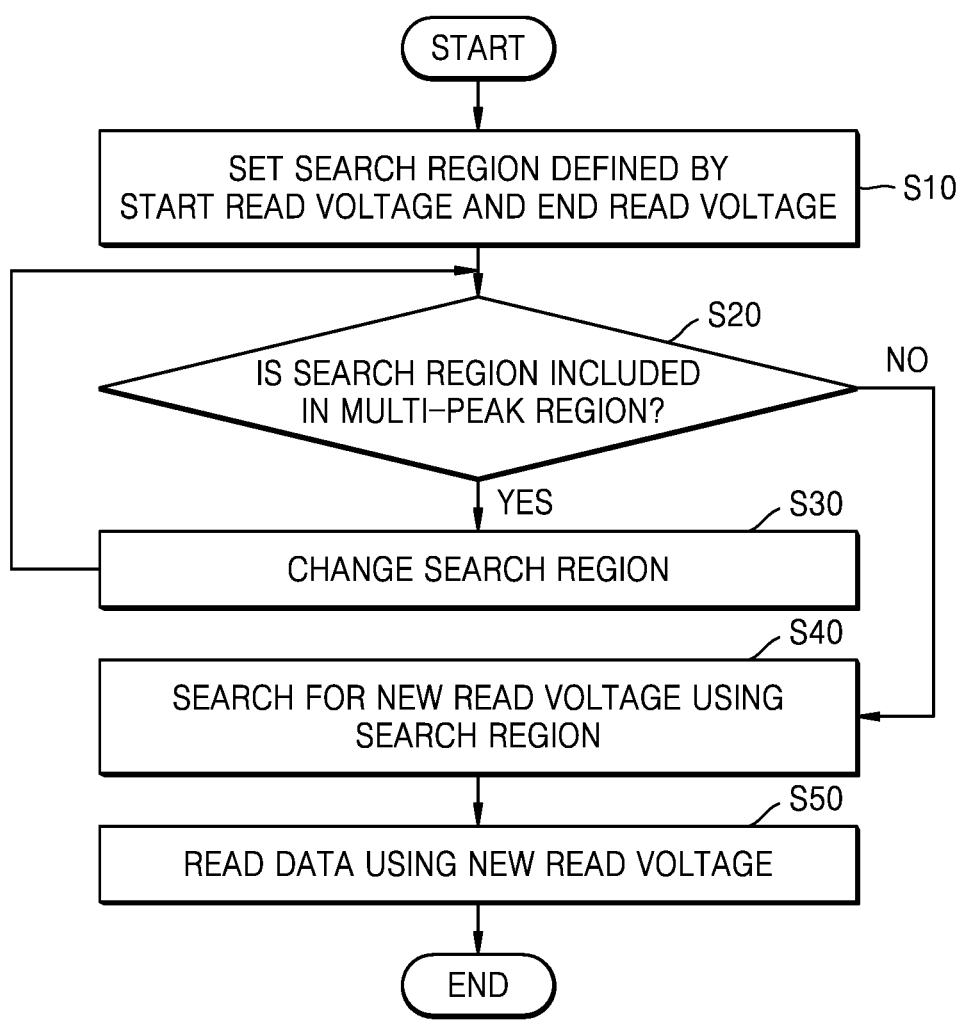
FIG. 19 is a flowchart illustrating an operating method of a memory device according to an embodiment.

FIG. 19 is a flowchart illustrating an operating method of a memory device according to an embodiment.

Referring to FIG. 19, in operation S10, the method may include performing an operation of setting a search region defined by a start read voltage and an end read voltage.

In operation S20, the method may include performing an operation of determining whether the search region belongs to the multi-peak region. Here, the multi-peak region may include a multi-peak distribution occurring in a threshold voltage distribution corresponding to a certain state of selected memory cells among a plurality of memory cells included in the non-volatile memory 200.

In operation S30, the method may include performing an operation of changing the search region. For example, in an example case in which the search region belongs to the multi-peak region (S20, YES), an operation of changing the search region is performed.

In operation S40, the method may include performing an operation of searching for a new read voltage using the search region. For example, in an example case in which the search region does not belong to the multi-peak region (S20, NO), an operation of searching for a new read voltage using the search region is performed.

In operation S50, the method may include performing an operation of reading data using a new read voltage.

The operation S20 according to some embodiments may include counting the number of memory cells having threshold voltages ranging from the start read voltage to the end read voltage, comparing the number of memory cells with a first validation reference number, determining whether a search region belong to a multi-peak region when the number of memory cells is greater than the first validation reference number, and determining that the search region does not belong to the multi-peak region when the number of memory cells is less than the first validation reference number. Operation S20 according to some embodiments is as described above with reference to FIG. 15A.

Operation S20 according to other embodiments may include counting the number of memory cells having threshold voltages from a start read voltage of a selected sub-search region among a plurality of sub-search regions to an end read voltage of the selected sub-search region, comparing the number of cells with the second validation reference number, determining that the search region belongs to a multi-peak region when the number of memory cells is greater than the second validation reference number, and determining that the search region does not belong to the multi-peak region when the number of memory cells is less than or equal to the second validation reference number. Operation S20 according to other embodiments is as described above with reference to FIG. 15B.

The operating method of FIG. 19 according to some embodiments may further include determining whether the search region belongs to a reference region (e.g., S200 of FIG. 18) and moving the search region (e.g., S300 of FIG. 18) by calculating a start read voltage and an end read voltage by a shift voltage. Here, if the search region belongs to the reference region, operation S20 is performed, and if the search region does not belong to the reference region, an operation of moving the search region is performed.

The operating method of FIG. 19 according to other embodiments may include counting the number of memory cells based on a certain read voltage between a start read voltage and an end read voltage if the search region belongs to the multi-peak region, comparing the number of memory cells with a reference number, moving the search region in the first direction by calculating the start read voltage and the end read voltage by the shift voltage when the number of memory cells is greater than the reference number, and moving the search region in the second direction different from the first direction by calculating the start read voltage and the end read voltage by the shift voltage if the number of memory cells is less than the reference number. The operating method of FIG. 19 according to other embodiments is the same as described above with reference to FIGS. 16A and 16B.

The operating method of FIG. 19 according to another embodiment may further include storing information on word lines connected to selected memory cells (operation 1000 of FIG. 18) when the search region belongs to a multi-peak region.

The operating method of FIG. 19 according to another embodiment may further include determining whether the changed search region belong to a multi-peak region when the search region belongs to the multi-peak region (S800 of FIG. 18), determining whether the changed search region belongs to the reference region when the changed search region belongs to the multi-peak region (S900 of FIG. 18), and providing a write command instructing to store data stored in the selected memory block including the selected memory cells in another memory block to the non-volatile memory when the changed search region does not belong to the reference region (operation S1000 of FIG. 18).

Figure 20:
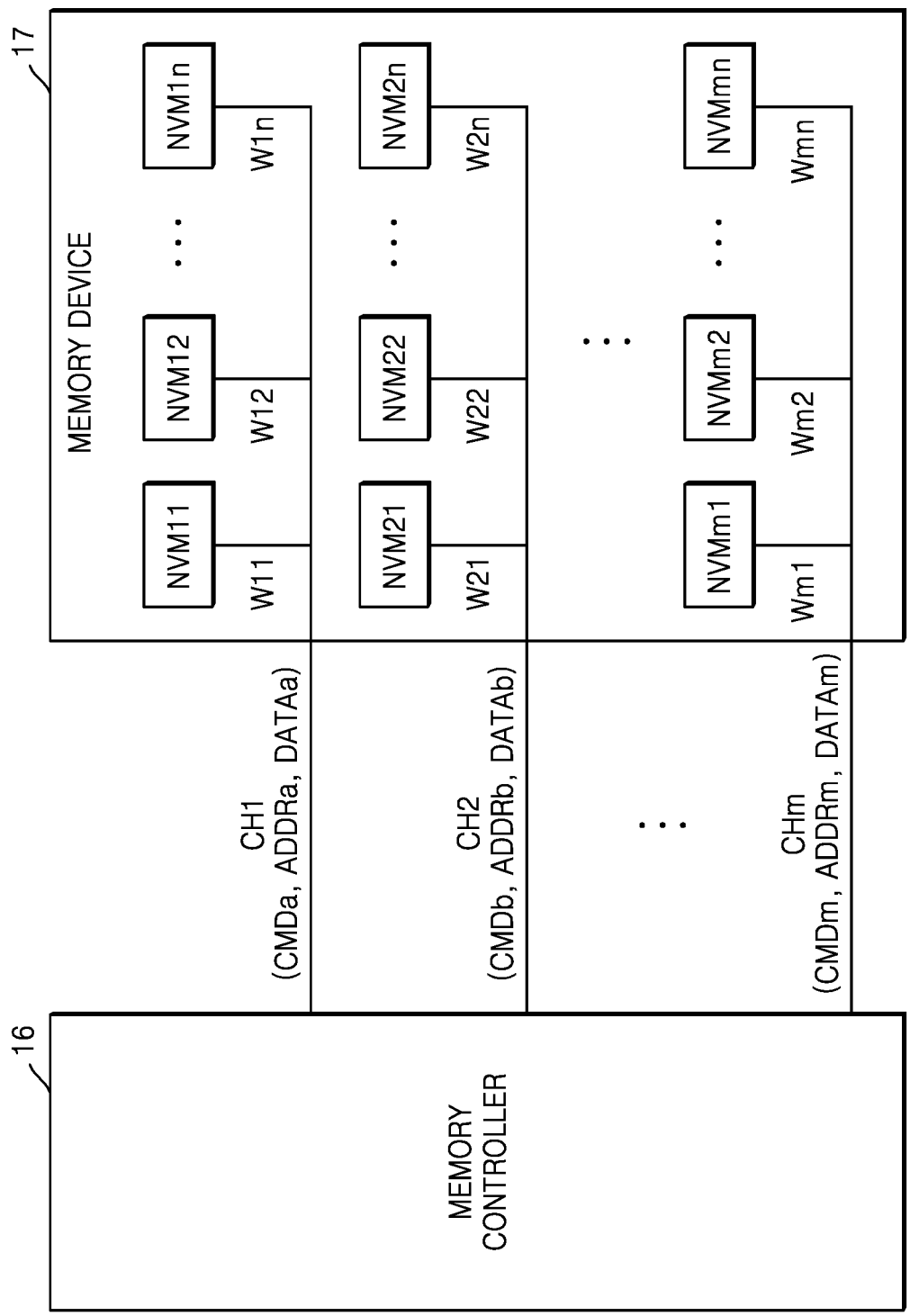
FIG. 20 is a block diagram illustrating a memory system according to an embodiment.

FIG. 20 is a block diagram illustrating a memory system 15 according to an embodiment.

Referring to FIG. 20, the memory system 15 may include a memory controller 16 and a memory device 17. The memory system 15 may support a plurality of channels CH1 to CHm, and the memory controller 16 may be connected to the memory device 17 through a plurality of channels CH1 to CHm. For example, the memory system 15 may be implemented as a storage device, such as a solid state drive (SSD). The memory system 15 may be implemented to execute defensive code.

The memory controller 16 may transmit and receive signals to and from the memory device 17 through a plurality of channels CH1 to CHm. For example, the memory controller 16 may transmit commands CMDa to CMDm, addresses ADDRa to ADDRm, and data DATAa to DATAm to the memory device 17 or receive data DATAa to DATAm from the memory device 17 through the channels CH1 to CHm.

The memory controller 16 may select one of the non-volatile memory devices NVM11 to NVMmn connected to the corresponding channel through each channel and transmit/receive signals with the selected non-volatile memory device. For example, the memory controller 16 may select the non-volatile memory device NVM11 among the non-volatile memory devices NVM11 to NVM1$n$ connected to the first channel CH1. The memory controller 16 may transmit command CMDa, address ADDRa, and data DATAa to the selected non-volatile memory device NVM11 through the first channel CH1, or receive data DATAa from the selected non-volatile memory device NVM11.

The memory controller 16 may transmit and receive signals to and from the memory device 17 in parallel through different channels. For example, while transmitting the command CMDa to the memory device 17 through the first channel CH1, the memory controller 16 may transmit the command CMDb to the memory device 17 through the second channel CH2. For example, while receiving data DATAb from the memory device 17 through the first channel CH1, the memory controller 16 may receive data DATAa from the memory device 17 through the second channel CH2.

The memory controller 16 may control overall operations of the memory device 17. The memory controller 16 may control each of the non-volatile memory devices NVM11 to NVMmn connected to the channels CH1 to CHm by transmitting signals to the channels CH1 to CHm. For example, the memory controller 16 may control a selected one of the non-volatile memory devices NVM11 to NVM1$n$ by transmitting the command CMDa and the address ADDRa through the first channel CH1.

The memory device 17 may include a plurality of non-volatile memory devices NVM11 to NVMmn. Each of the non-volatile memory devices NVM11 to NVMmn may be connected to one of the channels CH1 to CHm through a corresponding way. For example, the non-volatile memory devices NVM11 to NVM1$n$ may be connected to the first channel CH1 through ways W11 to W1$n$, and the non-volatile memory devices NVM21 to NVM2$n$ may be connected to the second channel CH2 through ways W21 to W1$n$. According to an embodiment, each of the non-volatile memory devices NVM11 to NVMmn may be implemented as a certain memory unit capable of operating according to individual commands from the memory controller 16. For example, each of the non-volatile memory devices NVM11 to NVMmn may be implemented as a chip or die, but the disclosure is not limited thereto.

When the non-volatile memory devices NVM11 to NVMmn are implemented as chips (or dies), the degree of degradation of threshold voltage distributions caused by coupling between adjacent memory cells may be different for each chip due to reasons of manufacturing processes.

According to a data recovery read operation described above, even if the degree of degradation of the different threshold voltage distributions is different for each chip, the read voltage optimized for each chip may be calculated, and thus, the data recovery read operation for each chip may read pass. Accordingly, the performance of a data recovery read operation for each chip may be improved by calculating optimal sub-read voltages based on coupling effects of adjacent memory cells that are different for each chip.

Each of the non-volatile memory devices NVM11 to NVMmn may operate under the control of the memory controller 16. For example, the non-volatile memory device NVM11 may program data DATAa according to the command CMDa, address ADDRa, and data DATAa provided through the first channel CH1. For example, the non-volatile memory device NVM21 may read data DATAb according to the command CMDb and address ADDRb provided through the second channel CH2 and transmit the read data DATAb to the memory controller 200b.

FIG. 20 shows that the memory device 17 communicates with the memory controller 16 through m channels and the memory device 17 includes n non-volatile memory devices corresponding to each channel, but the number of channels and the number of non-volatile memory devices connected to one channel may be variously changed.

Meanwhile, each non-volatile memory device according to an embodiment may be implemented in a chip-to-chip (C2C) structure.

While the disclosure has been particularly shown and described with reference to an embodiment thereof, it will be understood that various changes in form and details may be made therein without departing from the spirit and scope of the following claims.

What is claimed is:

1. A storage device comprising:
    a non-volatile memory configured to output data from selected memory cells based on read voltage information, the read voltage information comprising a start read voltage, an end read voltage, and a read command; and
    a memory controller configured to:
        determine whether a search region defined by the start read voltage and the end read voltage is within a multi-peak region of a threshold voltage distribution corresponding to a first state of the selected memory cells,
        based on the search region being within the multi-peak region, change the search region, and
        based on the search region not being within to the multi-peak region, determine a new read voltage using the search region.

2. The storage device of claim 1, wherein the memory controller is further configured to:
    determine whether the search region is within a reference region,
    based on the search region being within the reference region, determine whether the search region is within the multi-peak region, and
    based on the search region not being within the reference region, move the search region by calculating the start read voltage and the end read voltage by a shift voltage.

3. The storage device of claim 1, wherein the memory controller is further configured to:
    count a number of memory cells having threshold voltages from the start read voltage to the end read voltage,
    compare the number of memory cells with a first validation reference number,
    based on the number of memory cells being greater than the first validation reference number, determine that the search region is within the multi-peak region, and
    based on the number of memory cells being less than or equal to the first validation reference number, determine that the search region is not within to the multi-peak region.

4. The storage device of claim 1, wherein the search region comprises a plurality of sub-search regions respectively defined by different voltages from the start read voltage to the end read voltage, and
    the memory controller is further configured to:
        count a number of first memory cells having threshold voltages from a first start read voltage of a first sub-search region among the plurality of sub-search regions to a first end read voltage of the first sub-search region,
        compare the number of first memory cells with a second validation reference number,
        based on the number of first memory cells being greater than the second validation reference number, determine that the search region is within the multi-peak region, and
        based on the number of first memory cells being less than or equal to the second validation reference number, determine that the search region is not within the multi-peak region.

5. The storage device of claim 1, wherein the memory controller is further configured to:
    count a number of memory cells based on a first read voltage between the start read voltage and the end read voltage based on the search region being within the multi-peak region,
    compare the number of memory cells with a reference number,
    based on the number of memory cells being greater than the reference number, move the search region in a first direction by calculating the start read voltage and the end read voltage by a shift voltage, and
    based on the number of memory cells is being than the reference number, move the search region in a second direction, different from the first direction, by calculating the start read voltage and the end read voltage by the shift voltage.

6. The storage device of claim 1, wherein the memory controller is further configured to:
    count a number of memory cells based on a first read voltage between the start read voltage and the end read voltage based on the search region being within the multi-peak region,
    compare the number of memory cells with a reference number,
    based on the number of memory cells being greater than the reference number, expand a range of the search region in a first direction by increasing one of the start read voltage and the end read voltage by the shift voltage, and
    based on the number of memory cells being less than the reference number, expand the range of the search region in a second direction, different from the first direction, by increasing the other of the start read voltage and the end read voltage by the shift voltage.

7. The storage device of claim 1, wherein the memory controller is further configured to, based on the search region being within the multi-peak region, store information on word lines connected to the selected memory cells.

8. The storage device of claim 1, wherein the memory controller is further configured to:
    determine whether the changed search region is within the multi-peak region,
    based on the changed search region being within the multi-peak region, determine whether the changed search region is within a reference region, and
    based on the changed search region being within to the reference region, transmit, to the non-volatile memory, a write command instructing to store data stored in a selected memory block including the selected memory cells in another memory block.

9. An operating method of a memory controller, the operating method comprising:
    setting a search region defined by a start read voltage and an end read voltage;
    determining whether the search region is within a multi-peak region of a threshold voltage distribution corresponding to a first state of selected memory cells among a plurality of memory cells included in a non-volatile memory;
    based on the search region being within to the multi-peak region, changing the search region; and
    based on the search region not being within to the multi-peak region, determining a new read voltage using the search region.

10. The operating method of claim 9, further comprising:
    determining whether the search region is within a reference region;
    based on the search region being within the reference region, determining whether the search region is within the multi-peak region, and
    based on the search region not being within the reference region, moving the search region by calculating the start read voltage and the end read voltage by a shift voltage.

11. The operating method of claim 9, wherein the determining whether the search region is within the multi-peak region comprises:
    counting a number of memory cells having threshold voltages from the start read voltage to the end read voltage;
    comparing the number of memory cells with a first validation reference number;
    based on the number of memory cells being greater than the first validation reference number, determining that the search region is within the multi-peak region; and
    based on the number of memory cells being less than or equal to the first validation reference number, determining that the search region does is not within the multi-peak region.

12. The operating method of claim 9, wherein the search region comprises a plurality of sub-search regions respectively defined by different voltages from the start read voltage to the end read voltage, and
    the determining whether the search region is within the multi-peak region comprises:
        counting a number of first memory cells having threshold voltages from a first start read voltage of a first sub-search region among the plurality of sub-search regions to a first end read voltage of the first sub-search region;
        comparing the number of first memory cells with a second validation reference number;
        based on the number of first memory cells being greater than the second validation reference number, determining that the search region is within the multi-peak region; and
        based on the number of memory cells being less than or equal to the second validation reference number, determining that the search region is not within the multi-peak region.

13. The operating method of claim 9, further comprising:
    based on the search region being within the multi-peak region, counting a number of memory cells based on a first read voltage between the start read voltage and the end read voltage;
    comparing the number of memory cells with a reference number;
    based on the number of memory cells being greater than the reference number, moving the search region in a first direction by calculating the start read voltage and the end read voltage by a shift voltage; and
    based on the number of first memory cells is being than the reference number, moving the search region in a second direction, different from the first direction, by calculating the start read voltage and the end read voltage by the shift voltage.

14. The operating method of claim 9, further comprising storing information on word lines connected to the selected memory cells based on the search region being within the multi-peak region.

15. The operating method of claim 9, further comprising:
    determining whether the changed search region is within the multi-peak region;
    based on the changed search region being within the multi-peak region, determining whether the changed search region is within a reference region; and
    based on the changed search region being within to the reference region, transmitting, to the non-volatile memory, a write command instructing to store data stored in a selected memory block including the selected memory cells in another memory block.

16. A storage device comprising:
    a non-volatile memory configured to output data from selected memory cells based on read voltage information comprising a start read voltage and an end read voltage and a read command; and
    a memory controller configured to provide the read voltage information and the read command to the non-volatile memory, the memory controller comprising:
        a first register configured to store reference region data representing a reference region;
        a search region determination circuit configured to:
            determine whether a search region defined by the start read voltage and the end read voltage is within the reference region, and
            output search region data representing the search region within the reference region;
        a second register configured to store validation reference number data representing a validation reference number;
        a search region validation circuit configured to:
            validate the search region of the search region data based on the search region data and the validation reference number data, and
            output validation result data corresponding to a validation result and validation data corresponding to a validated search region; and a read level determination circuit configured to determine a new read voltage using the validated search region of the validation data;

wherein the search region validation circuit is further configured to:

based on the search region being within a multi-peak region, count a number of memory cells based on a first read voltage between the start read voltage and the end read voltage;

compare the number of memory cells with a reference number;

based on the number of memory cells being greater than the reference number, move the search region in a first direction by calculating the start read voltage and the end read voltage by a shift voltage; and based on the number of memory cells being less than the reference number, move the search region in a second direction, different from the first direction, by calculating the start read voltage and the end read voltage by the shift voltage.

17. The storage device of claim 16, wherein the search region validation circuit is further configured to:

count a number of memory cells having threshold voltages from the start read voltage to the end read voltage, compare the number of memory cells with the validation reference number, based on the number of memory cells being greater than the validation reference number, determine that the search region of the search region data fails validation, and based on the number of memory cells being less than or equal to the validation reference number, determine that the search region of the search region data passes validation.

18. The storage device of claim 16, wherein the search region comprises a plurality of sub-search regions each defined by different voltages from the start read voltage to the end read voltage, and the search region validation circuit is further configured to:

count a number of first memory cells having threshold voltages from a first start read voltage of a first sub-search region among the plurality of sub-search regions to a first end read voltage of the first sub-search region, compare the number of first memory cells with the validation reference number, based on the number of memory cells being greater than the validation reference number, determine that the search region of the search region data fails validation, and based on the number of memory cells being less than or equal to the validation reference number, determine that the search region of the search region data passes validation.

19. The storage device of claim 16, wherein the search region validation circuit is further configured to store information on word lines connected to the selected memory cells in the second register based on the search region being within the multi-peak region.

* * * * *